United States Patent
Wang

(10) Patent No.: US 11,713,382 B2
(45) Date of Patent: Aug. 1, 2023

(54) POLYURETHANE FOAM

(71) Applicant: LEVITEX FOAMS LIMITED, Altrincham (GB)

(72) Inventor: Jianfeng Wang, Haining (CN)

(73) Assignee: LEVITEX FOAMS LIMITED, Altrincham (GB)

( * ) Notice: Subject to any disclaimer, the term of this patent is extended or adjusted under 35 U.S.C. 154(b) by 301 days.

(21) Appl. No.: 16/491,624

(22) PCT Filed: Mar. 7, 2018

(86) PCT No.: PCT/CN2018/078261
§ 371 (c)(1),
(2) Date: Sep. 6, 2019

(87) PCT Pub. No.: WO2018/161913
PCT Pub. Date: Sep. 13, 2018

(65) Prior Publication Data
US 2021/0179799 A1   Jun. 17, 2021

(30) Foreign Application Priority Data
Mar. 8, 2017   (GB) ..................... 1703738

(51) Int. Cl.
*C08J 9/14* (2006.01)
*C08G 18/20* (2006.01)
*C08G 18/24* (2006.01)
*C08G 18/48* (2006.01)
*C08G 18/76* (2006.01)

(52) U.S. Cl.
CPC .......... *C08J 9/145* (2013.01); *C08G 18/2081* (2013.01); *C08G 18/244* (2013.01); *C08G 18/48* (2013.01); *C08G 18/7664* (2013.01); *C08G 2110/005* (2021.01); *C08G 2110/0008* (2021.01); *C08G 2110/0058* (2021.01); *C08G 2410/00* (2013.01); *C08J 2201/026* (2013.01)

(58) Field of Classification Search
CPC ......... C08G 18/165; C08G 18/2081; C08G 18/244; C08G 18/3275; C08G 18/48; C08G 18/4804; C08G 18/4829; C08G 18/6688; C08G 18/7621; C08G 18/7664; C08G 2110/0008; C08G 2110/005; C08G 2110/0058; C08G 2350/00; C08G 2410/00; C08J 9/0028; C08J 9/0038; C08J 9/0052; C08J 9/145; C08J 2201/026; C08J 2375/04; C08K 5/34922
See application file for complete search history.

(56) References Cited

U.S. PATENT DOCUMENTS

| | | | |
|---|---|---|---|
| 4,190,697 A | 2/1980 | Ahrens | |
| 5,157,056 A | 10/1992 | McGovern | |
| 5,500,452 A | 3/1996 | Baker, Jr. et al. | |
| 8,901,187 B1 | 12/2014 | Dounis et al. | |
| 2002/0147247 A1 | 10/2002 | Falke et al. | |
| 2003/0220409 A1 | 11/2003 | Schilling et al. | |
| 2005/0038132 A1 | 2/2005 | Gummaraju et al. | |
| 2011/0190407 A1* | 8/2011 | Balbo Block | C08J 9/0038 524/122 |
| 2015/0266993 A1 | 9/2015 | Choi et al. | |
| 2016/0017086 A1 | 1/2016 | Grossman et al. | |
| 2016/0145377 A1* | 5/2016 | Honkomp | C08G 18/409 521/159 |

FOREIGN PATENT DOCUMENTS

| | | |
|---|---|---|
| CN | 101016368 A | 8/2007 |
| CN | 101096406 A | 1/2008 |
| GB | 2329642 A | 3/1999 |
| GB | 2490733 A | 11/2012 |
| GB | 2490734 A | 11/2012 |
| JP | 59-27912 A | 2/1984 |
| WO | 2009/117630 A2 | 9/2009 |
| WO | 2014/074706 A1 | 5/2014 |

OTHER PUBLICATIONS

Great Britain Office Action for Application No. GB1703738.3, dated Sep. 6, 2017, 5 pages.
Great Britain Office Action for Application No. GB1703738.3, dated Jan. 22, 2018, 3 pages.
International Search Report and Written Opinion for Application No. PCT/CN2018/078261, dated May 30, 2018, 10 pages.

\* cited by examiner

*Primary Examiner* — John M Cooney
(74) *Attorney, Agent, or Firm* — McCarter & English, LLP; Steven G. Davis; Wei Song

(57) ABSTRACT

A polyurethane foam is disclosed having unique load bearing characteristics rendering it suitable for a variety of applications. The foam exhibits high surface-softness and smoothness properties, making it well-suited for use in articles such as pillows and mattress toppers. However, upon continued application of pressure, the resilience of the foam increases sharply, translating into a remarkable support characteristics that make the foam suitable for use in the seat portions of chairs and sofas, as well as in the base portion of mattresses. The foams therefore address the limitations of conventional, high-resilience and visco-elastic polyurethane foams. A process of making the foam and its use in various articles is also disclosed.

10 Claims, 2 Drawing Sheets

POLYURETHANE FOAM

CROSS-REFERENCE TO RELATED APPLICATIONS

This application is a U.S. national stage filing, under 35 U.S.C. § 371(c), of International Application No. PCT/CN2018/078261, filed on Mar. 7, 2018, which claims priority to United Kingdom Patent Application No. 1703738.3, filed on Mar. 8, 2017. The entire contents of each of the aforementioned applications are incorporated herein by reference.

INTRODUCTION

The present invention relates to a polyurethane foam, as well as to its method of manufacture and it use in articles and applications requiring cushioning and/or support.

BACKGROUND OF THE INVENTION

Flexible polyurethane foams typically fall into one of three principle categories. Although conventional foam, high-resilience (HR) foam and visco-elastic foam (also known as memory foam) are all generally useful in the bedding and furniture sphere, their individual characteristics renders each foam particularly suited to certain applications. Owing to its flexibility and support properties, conventional foam, is traditionally used in the back portion of seats and chairs, as well as the base portion of mattresses. HR foam, offering good body support and resilience, is well-suited for use in the seat portion of seats, chairs and sofas. Visco-elastic is typically used in the manufacture of pillows, the upper portion of mattresses and in mattress toppers, where its shape-conforming, energy-attenuating and sound dampening properties are particularly advantageous.

In spite of the usefulness of conventional, HR and visco-elastic foams, there exist numerous applications for which it would be advantageous to combine the benefits of multiple foam types. Efforts to address this need by combining two or more foam types into a given article—for example in discrete laminated layers—have proved unsuccessful, owing in part to the resulting composite foam exhibiting undesirable properties at the interface of the individual foams.

There is therefore a need for a new type of foam that combines the advantages of conventional, HR and visco-elastic foams into a single material. In addition, in order to maximize the applicability of the material across multiple applications, there is an ongoing need for a foam that exhibits other advantageous properties, such as high sag value and increased surface softness and smoothness.

The present invention was devised with the foregoing in mind.

SUMMARY OF THE INVENTION

According to a first aspect of the present invention there is provided a process for the preparation of a polyurethane foam, the process comprising/consisting essentially of/consisting of the steps of:
a) mixing together the following ingredients in the amounts specified:
  i. at least one polyol having an average molecular weight of 6,000-12,000 Da, wherein the polyol has an OH functionality of 2-4,
  ii. at least one methylene diphenyl diisocyanate having an NCO content of 26-33%, wherein the amount of diisocyanate relative to the amount of polyol is sufficient to give an ISO index of 72-110,
  iii. at least one surfactant in an amount of 0.4-1.0 per hundred parts polyol,
  iv. at least one amine catalyst in an amount of 0.2-0.6 per hundred parts polyol,
  v. water in an amount of 1.5-4.0 per hundred parts polyol, and
  vi. optionally at least one flame retardant in an amount of 4.0-15.0 per hundred parts polyol;
b) curing the mixture resulting from step a).

According to a second aspect of the present invention there is provided a polyurethane foam obtainable, obtained or directly obtained by the process according to the first aspect of the invention.

According to a third aspect of the present invention there is provided a polyurethane foam having a sag value of 2.8-3.5, wherein the sag value is calculated according to the following expression:

$$Sag\ value = \frac{IFD65\%}{IFD25\%}$$

and wherein IFD65% and IFD25% values are determined according to the protocol set forth in ISO 2439:2008.

According to a fourth aspect of the present invention there is provided an article comprising a polyurethane foam according to the second or third aspect of the invention.

According to a further aspect of the present invention there is provided a process for the preparation of a polyurethane foam, the process comprising/consisting essentially of/consisting of the steps of:
a) mixing together the following ingredients in the amounts specified:
  i. at least one polyol having an average molecular weight of 6,000-12,000 Da, wherein the polyol has an OH functionality of 2-4,
  ii. at least one methylene diphenyl diisocyanate having an NCO content of 26-33%, wherein the amount of diisocyanate relative to the amount of polyol is sufficient to give an ISO index of 65-90,
  iii. at least one surfactant in an amount of 0.4-1.0 per hundred parts polyol,
  iv. at least one amine catalyst in an amount of 0.1-0.6 per hundred parts polyol, and
  v. water in an amount of 1.5-4.0 per hundred parts polyol;
b) curing the mixture resulting from step a).

DETAILED DESCRIPTION OF THE INVENTION

Preparation of Polyurethane Foam

As described hereinbefore, the present invention provides a process for the preparation of a polyurethane foam, the process comprising the steps of:
a) mixing together the following ingredients in the amounts specified:
  i. at least one polyol having an average molecular weight of 6,000-12,000 Da, wherein the polyol has an OH functionality of 2-4,
  ii. at least one methylene diphenyl diisocyanate having an NCO content of 26-33%, wherein the amount of diisocyanate relative to the amount of polyol is sufficient to give an ISO index of 72-110, iii. at least one surfactant in an amount of 0.4-1.0 per hundred parts polyol,
iv. at least one amine catalyst in an amount of 0.2-0.6 per hundred parts polyol,
v. water in an amount of 1.5-4.0 per hundred parts polyol, and
vi. optionally at least one flame retardant in an amount of 4.0-15.0 per hundred parts polyol;
b) curing the mixture resulting from step a).

Against the backdrop of conventional, HR and viscoelastic flexible polyurethane foams, the present inventor has now devised a process that surprisingly allows the benefits of each of these foams to be combined into a single new flexible polyurethane foam. In particular, foams obtainable by the present process combine the support and pressure-reducing characteristics of conventional, HR and viscoelastic foam, whilst simultaneously offering noticeably improved surface smoothness and softness. Such characteristics are attributable, at least in part, to the unique load-bearing properties of those foams obtainable by the present process. In particular, the present process results in foams that exhibit a high degree of surface softness and smoothness upon initial application of pressure to the foam's surface. However, upon continued application of pressure, the foam's resistance to compression increases sharply, thus offering increased resilience and support. As a consequence, the foams obtainable by the present process are not only well-suited to applications requiring robust support, such as in seats and mattress bases, but are equally useful in articles that are intended to be pleasing to the touch, such as mattress surfaces and mattress toppers.

Optionally, those ingredients mixed in step a) comprise at least one flame retardant in an amount of 4.0-15.0 per hundred parts polyol. The resulting foams exhibit BS5852 Crib5 fire retardancy. BS5852 Crib5 fire retardancy is a UK requirement which is perhaps the most stringent of all international flame retardancy standards. Achieving high surface-softness, high sag value and BS5852 crib 5 compliance in a single polyurethane foam is particularly advantageous.

In an embodiment, the ingredients specified in step a) are mixed at a speed of 2,000-8,000 rpm. Suitably, the ingredients specified in step a) are mixed at a speed of 4,000-6,000 rpm.

In an embodiment, the polyol, which is suitably a polyether polyol, has an average molecular weight of 7,000-9,000 Da. Suitably, the polyol has an average molecular weight of 7,500-8,500 Da.

In an embodiment, the polyol has an OH functionality of 2.5-3.5. The OH functionality describes the average number of OH groups in a molecule of polyol, and can be calculated according to the following expression:

$$OH \text{ functionality} = \frac{\text{total moles } OH}{\text{total moles polyol}}$$

Suitably, the polyol has an OH functionality of 2.8-3.2.

In an embodiment, the polyol has an OH value of 20-48. The OH value (also known as OH number) is the milligrams of potassium hydroxide equivalent to the hydroxyl content in one gram of polyol, and can be calculated according to the following expression:

$$OH \text{ value} = \frac{56100 * OH \text{ functionality}}{\text{equivalent weight of polyol}}$$

Suitably, the polyol has an OH value of 23-33. More suitably, the polyol has an OH value of 26-30.

Suitably, only one polyol (e.g. a polyether polyol) is used in step a).

In an embodiment, the methylene diphenyl diisocyanate has an NCO content of 28-33%. The NCO content (expressed as a percentage) describes the weight percentage of NCO groups in an isocyanate-containing material. Suitably, the methylene diphenyl diisocyanate has an NCO content of 29-32%. More suitably, the methylene diphenyl diisocyanate has an NCO content of 29-31%. Most suitably, the methylene diphenyl diisocyanate has an NCO content of 29-30.5%.

Suitably, methylene diphenyl diisocyanate is the only isocyanate used in step a).

In an embodiment, the methylene diphenyl diisocyanate is a modified methylene diphenyl diisocyanate.

In an embodiment, the methylene diphenyl diisocyanate has a density at 25° C. of 1.0-1.4 g cm$^{-3}$. More suitably, the methylene diphenyl diisocyanate has a density at 25° C. of 1.1-1.3 g cm$^{-3}$.

In an embodiment, the methylene diphenyl diisocyanate has a viscosity at 25° C. of 45-85 mPa s. Suitably, the methylene diphenyl diisocyanate has a viscosity at 25° C. of 55-75 mPa s. More suitably, the methylene diphenyl diisocyanate has a viscosity at 25° C. of 60-70 mPa s.

In an embodiment, the methylene diphenyl diisocyanate has a flash point (according to the Cleveland Cup ASTM method D92) at 25° C. of 180-230° C. Suitably, the methylene diphenyl diisocyanate has a flash point at 25° C. of 195-215° C.

In an embodiment, the methylene diphenyl diisocyanate is a modified methylene diphenyl diisocyanate having a density at 25° C. of 1.1-1.3 gcm$^{-3}$, a viscosity at 25° C. of 55-75 mPa s, and a flash point at 25° C. of 195-215° C.

In an embodiment, the amount of methylene diphenyl diisocyanate relative to the amount of polyol is sufficient to give an ISO index of 73-105. Suitably, the amount of methylene diphenyl diisocyanate relative to the amount of polyol is sufficient to give an ISO index of 80-103. More suitably, the amount of methylene diphenyl diisocyanate relative to the amount of polyol is sufficient to give an ISO index of 85-100. Even more suitably, the amount of methylene diphenyl diisocyanate relative to the amount of polyol is sufficient to give an ISO index of 87-95. Most suitably, the amount of methylene diphenyl diisocyanate relative to the amount of polyol is sufficient to give an ISO index of 88-92.

In another embodiment, the amount of methylene diphenyl diisocyanate relative to the amount of polyol is sufficient to give an ISO index of 70-80. Alternatively, the amount of methylene diphenyl diisocyanate relative to the amount of polyol is sufficient to give an ISO index of 73-78.

Any surfactant suitable for use in the preparation of a polyurethane foam may be used. Suitable surfactants are well known to the skilled person, and include polydimethylsiloxane-polyoxyalkylene block copolymers, silicone oils and nonylphenol ethoxylates. Suitably, the surfactant is a silicone oil.

In an embodiment, in step a), the surfactant is present in an amount of 0.4-0.8 per hundred parts polyol. Suitably, in step a), the surfactant is present in an amount of 0.5-0.8 per hundred parts polyol. More suitably, the surfactant is present in an amount of 0.5-0.75 per hundred parts polyol. Most suitably, in step a), the surfactant is present in an amount of 0.55-0.75 per hundred parts polyol.

Alternatively, in step a), the surfactant is present in an amount of 0.45-0.65 per hundred parts polyol.

In an embodiment, the amine catalyst is suitable for enhancing the nucleophilicity of the polyol. Suitable amine catalysts include triethylenediamine (TEDA), dimethylcyclohexylamine (DMCHA), triethylene diamine, bis(2-dimethyl amino ethyl)ether (BDE) and dimethylethanolamine (DMEA). Most suitably, the catalyst is triethylene diamine.

In an embodiment, in step a), the amine catalyst is present in an amount of 0.2-0.55 per hundred parts polyol. Suitably, in step a), the amine catalyst is present in an amount of 0.45-0.55 per hundred parts polyol.

Alternatively, in step a), the amine catalyst is present in an amount of 0.2-0.4 or 0.25-0.35 per hundred parts polyol.

In an embodiment, in step a), water is present in an amount of 1.5-3.5 per hundred parts polyol. Suitably, in step a), water is present in an amount of 1.5-3.3 per hundred parts polyol. More suitably, in step a), water is present in an amount of 1.75-2.8 per hundred parts polyol. Most suitably, in step a), water is present in an amount of 1.75-2.5 per hundred parts polyol.

Alternatively, in step a), water is present in an amount of 2.0-3.5 per hundred parts polyol. Suitably, in step a), water is present in an amount of 2.5-3.5 per hundred parts polyol. More suitably, in step a), water is present in an amount of 2.9-3.3 per hundred parts polyol In an embodiment, the flame retardant is present in an amount of 5.0-14.0 per hundred parts polyol. More suitably, the flame retardant is present in an amount of 6.5-14.0 per hundred parts polyol. More suitably, the flame retardant is present in an amount of 8.0-13.5 per hundred parts polyol. Even more suitably, the flame retardant is present in an amount of 10.0-13.0 per hundred parts polyol.

Alternatively, the flame retardant is present in an amount of 4.0-10.0 per hundred parts polyol. Suitably, the flame retardant is present in an amount of 6.0-8.0 per hundred parts polyol.

When included in step a), the flame retardant may be a chlorinated phosphate ester, a halogen-free phosphate ester, or a mixture thereof.

When included in step a), the flame retardant may be used in conjunction with a flame-retardant synergist. Suitably, the synergist is present in an amount of 8.0-20.0 per hundred parts polyol. More suitably, the synergist is present in an amount of 9.0-17.0 per hundred parts polyol. Most suitably, the synergist is present in an amount of 13.0-16.0 per hundred parts polyol.

Alternatively, the synergist is present in an amount of 8.0-15.0 per hundred parts polyol. Suitably, the synergist is present in an amount of 8.0-12.0 per hundred parts polyol.

The synergist may be melamine or melamine-based.

In an embodiment, those ingredients mixed in step a) further comprise at least one tin catalyst in an amount of 0.01-0.2. Suitably, those ingredients mixed in step a) further comprise at least one tin catalyst in an amount of 0.01-0.1 per hundred parts polyol. More suitably, those ingredients mixed in step a) further comprise at least one tin catalyst in an amount of 0.01-0.05 per hundred parts polyol.

When included in step a), any tin catalyst suitable for use in the preparation of a polyurethane foam may be used. Suitable tin catalysts are well known to the skilled person, and include dibutyltin dioctanoate, dibutyltin dilaurate and tin alkyl carboxylates (eg. stannous octoate). In an embodiment, the tin catalyst is a mild Lewis acid. Suitably, the tin catalyst is a tin alkyl carboxylate (e.g. stannous octoate).

In an embodiment, those ingredients mixed in step a) further comprise at least one of a chain extender and a cross-linker in an amount of 0.2-1.5 per hundred parts polyol. Suitably, those ingredients mixed in step a) further comprise at least one of a chain extender and a cross-linker in an amount of 0.5-0.9 per hundred parts polyol.

Alternatively, those ingredients mixed in step a) further comprise at least one of a chain extender and a cross-linker in an amount of 0.6-1.2 per hundred parts polyol.

When included in step a), any chain extender and/or cross linker suitable for use in the preparation of a polyurethane foam may be used. Suitable chain extenders and/or cross linkers are well known to the skilled person, and include ethylene glycol, 1,4-butanediol, ethanol amine and diethanol amine. In an embodiment, the chain extender and/or cross linker is diethanol amine.

In an embodiment, those ingredients mixed in step a) further comprise at least one cell opener in an amount of 1.0-6.0 per hundred parts polyol. Suitably, those ingredients mixed in step a) further comprise at least one cell opener in an amount of 2.0-5.5 per hundred parts polyol.

When included in step a), any cell opener suitable for use in the preparation of a polyurethane foam may be used. Suitable cell openers are well known to the skilled person, and include silicone-based compounds and polyol-based compounds. In an embodiment, the cell opener is a polyol-based compound.

In an embodiment, those ingredients mixed in step a) further comprise at least one blowing agent in an amount of 1.0-10.0 per hundred parts polyol. Considering that the presence of water in step a) is mandatory (which reacts with the isocyanate to produce $CO_2$), the presence of a dedicated blowing agent is optional. Suitably, those ingredients mixed in step a) further comprise at least one blowing agent in an amount of 1.5-8.0 per hundred parts polyol.

Alternatively, those ingredients mixed in step a) further comprise at least one blowing agent in an amount of 6.0-8.0 per hundred parts polyol.

When included in step a), any blowing agent suitable for use in the preparation of a polyurethane foam may be used. Suitable blowing agents are well known to the skilled person, and include that materials that are capable of absorbing heat from the exothermic reactions, vaporizing and providing additional gas useful in expanding the foam to a lower density. In an embodiment, the blowing agent is methylene chloride.

In an embodiment, those ingredients mixed in step a) further comprise a pigment.

In an embodiment, in step b), the mixture resulting from step a) is cured in an atmosphere of air.

In an embodiment, in step b), the mixture resulting from step a) is cured at a temperature of 15-40° C.

In an embodiment, in step b), the mixture resulting from step a) is cured at a pressure of 0.9 to 1.1 bar.

In an embodiment, in step b), the foam is cured for 24-120 hours. Suitably, in step b), the foam is cured for 48-96 hours.

In an embodiment, the process is continuous (as opposed to a batch or discontinuous process). Suitably, foam is formed at a speed of 3-5 m/min.

In an embodiment, in step a), the polyol is fed to a mixer at a rate of 100-140 kg/min. Suitably, in step a), the polyol is fed to a mixer at a rate of 110-130 kg/min.

In an embodiment, in step a), the methylene diphenyl diisocyanate is fed to a mixer at a rate of 30-80 kg/min. Suitably, in step a), the methylene diphenyl diisocyanate is fed to a mixer at a rate of 40-60 kg/min.

In an embodiment, in step a), the surfactant is fed to a mixer at a rate of 45-85 kg/min. Suitably, in step a), the surfactant is fed to a mixer at a rate of 55-75 kg/min.

In an embodiment, in step a), the amine catalyst is fed to a mixer at a rate of 20-50 kg/min. Suitably, in step a), the amine catalyst is fed to a mixer at a rate of 30-40 kg/min.

In an embodiment, in step a), water is fed to a mixer at a rate of 2-6 kg/min. Suitably, in step a), water is fed to a mixer at a rate of 3-5 kg/min.

In an embodiment, when it features in step a), the flame retardant is fed to a mixer at a rate of 5-12 kg/min. Suitably, when it features in step a), the flame retardant is fed to a mixer at a rate of 7-10 kg/min.

In an embodiment, when it features in step a), the flame retardant synergist is fed to a mixer at a rate of 8-16 kg/min. Suitably, when it features in step a), the flame retardant synergist is fed to a mixer at a rate of 10-14 kg/min.

In an embodiment, when it features in step a), the blowing agent is fed to a mixer at a rate of 5-12 kg/min. Suitably, when it features in step a), the blowing agent is fed to a mixer at a rate of 7-10 kg/min.

In an embodiment, when it features in step a), the tin catalyst is fed to a mixer at a rate of 0.01-0.07 kg/min. Suitably, when it features in step a), the tin catalyst is fed to a mixer at a rate of 0.025-0.055 kg/min.

In an embodiment, when it features in step a), the cell opener is fed to a mixer at a rate of 1-6 kg/min. Suitably, when it features in step a), the cell opener is fed to a mixer at a rate of 2.5-4.5 kg/min.

In an embodiment, when it features in step a), the chain extender and/or cross linker is fed to a mixer at a rate of 0.1-3.0 kg/min. Suitably, when it features in step a), the chain extender and/or cross linker is fed to a mixer at a rate of 0.5-1.5 kg/min.

In an embodiment, the ingredients specified in step a) are mixed at a pressure of 0.2-0.4 mPa.

In an embodiment, the process is as defined in any one of numbered paragraphs (1)-(30):

1) a) mixing together the following ingredients in the amounts specified:
   i. at least one polyol having an average molecular weight of 6,000-12,000 Da, wherein the polyol has an OH functionality of 2-4,
   ii. at least one methylene diphenyl diisocyanate having an NCO content of 26-33%, wherein the amount of diisocyanate relative to the amount of polyol is sufficient to give an ISO index of 73-105,
   iii. at least one surfactant in an amount of 0.5-0.75 per hundred parts polyol,
   iv. at least one amine catalyst in an amount of 0.2-0.6 per hundred parts polyol,
   v. water in an amount of 1.5-4.0 per hundred parts polyol, and
   vi. optionally at least one flame retardant in an amount of 4.0-15.0 per hundred parts polyol;
   b) curing the mixture resulting from step a).

2) a) mixing together the following ingredients in the amounts specified:
   i. at least one polyol having an average molecular weight of 6,000-12,000 Da, wherein the polyol has an OH functionality of 2-4,
   ii. at least one methylene diphenyl diisocyanate having an NCO content of 26-33%, wherein the amount of diisocyanate relative to the amount of polyol is sufficient to give an ISO index of 72-110,
   iii. at least one surfactant in an amount of 0.4-1.0 per hundred parts polyol,
   iv. at least one amine catalyst in an amount of 0.2-0.55 per hundred parts polyol,
   v. water in an amount of 1.5-3.3 per hundred parts polyol, and
   vi. optionally at least one flame retardant in an amount of 4.0-15.0 per hundred parts polyol;
   b) curing the mixture resulting from step a).

3) a) mixing together the following ingredients in the amounts specified:
   i. at least one polyol having an average molecular weight of 6,000-12,000 Da, wherein the polyol has an OH functionality of 2-4,
   ii. at least one methylene diphenyl diisocyanate having an NCO content of 26-33%, wherein the amount of diisocyanate relative to the amount of polyol is sufficient to give an ISO index of 73-105,
   iii. at least one surfactant in an amount of 0.5-0.75 per hundred parts polyol,
   iv. at least one amine catalyst in an amount of 0.2-0.55 per hundred parts polyol,
   v. water in an amount of 1.5-3.3 per hundred parts polyol, and
   vi. optionally at least one flame retardant in an amount of 4.0-15.0 per hundred parts polyol;
   b) curing the mixture resulting from step a).

4) a) mixing together the following ingredients in the amounts specified:
   i. at least one polyol having an average molecular weight of 6,000-12,000 Da, wherein the polyol has an OH functionality of 2-4,
   ii. at least one methylene diphenyl diisocyanate having an NCO content of 26-33%, wherein the amount of diisocyanate relative to the amount of polyol is sufficient to give an ISO index of 73-105,
   iii. at least one surfactant in an amount of 0.5-0.75 per hundred parts polyol,
   iv. at least one amine catalyst in an amount of 0.2-0.55 per hundred parts polyol,
   v. water in an amount of 1.5-3.3 per hundred parts polyol, and
   vi. at least one flame retardant in an amount of 4.0-15.0 per hundred parts polyol;
   b) curing the mixture resulting from step a).

5) a) mixing together the following ingredients in the amounts specified:
   i. at least one polyol having an average molecular weight of 6,000-12,000 Da, wherein the polyol has an OH functionality of 2-4,
   ii. at least one methylene diphenyl diisocyanate having an NCO content of 26-33%, wherein the amount of diisocyanate relative to the amount of polyol is sufficient to give an ISO index of 73-105,
   iii. at least one surfactant in an amount of 0.5-0.75 per hundred parts polyol,
   iv. at least one amine catalyst in an amount of 0.2-0.55 per hundred parts polyol,
   v. water in an amount of 1.5-3.3 per hundred parts polyol, and
   vi. at least one flame retardant in an amount of 6.5-14.0 per hundred parts polyol;
   b) curing the mixture resulting from step a).

6) a) mixing together the following ingredients in the amounts specified:
   i. at least one polyol having an average molecular weight of 6,000-12,000 Da, wherein the polyol has an OH functionality of 2-4,
   ii. at least one methylene diphenyl diisocyanate having an NCO content of 26-33%, wherein the amount of diisocyanate relative to the amount of polyol is sufficient to give an ISO index of 73-105,
iii. at least one surfactant in an amount of 0.5-0.75 per hundred parts polyol,
iv. at least one amine catalyst in an amount of 0.2-0.55 per hundred parts polyol,
v. water in an amount of 1.5-3.3 per hundred parts polyol,
vi. at least one flame retardant in an amount of 6.5-14.0 per hundred parts polyol, and
vii. at least one flame retardant synergist in an amount of 8.0-20.0 per hundred parts polyol;
b) curing the mixture resulting from step a).

7) a) mixing together the following ingredients in the amounts specified:
i. at least one polyol having an average molecular weight of 6,000-12,000 Da, wherein the polyol has an OH functionality of 2-4,
ii. at least one methylene diphenyl diisocyanate having an NCO content of 26-33%, wherein the amount of diisocyanate relative to the amount of polyol is sufficient to give an ISO index of 73-105,
iii. at least one surfactant in an amount of 0.5-0.75 per hundred parts polyol,
iv. at least one amine catalyst in an amount of 0.2-0.55 per hundred parts polyol,
v. at least one tin catalyst in an amount of 0.01-0.2 per hundred parts polyol,
vi. water in an amount of 1.5-3.3 per hundred parts polyol,
vii. at least one flame retardant in an amount of 6.5-14.0 per hundred parts polyol, and
viii. at least one flame retardant synergist in an amount of 8.0-20.0 per hundred parts polyol;
b) curing the mixture resulting from step a).

8) a) mixing together the following ingredients in the amounts specified:
i. at least one polyol having an average molecular weight of 6,000-12,000 Da, wherein the polyol has an OH functionality of 2-4,
ii. at least one methylene diphenyl diisocyanate having an NCO content of 26-33%, wherein the amount of diisocyanate relative to the amount of polyol is sufficient to give an ISO index of 73-105,
iii. at least one surfactant in an amount of 0.5-0.75 per hundred parts polyol,
iv. at least one amine catalyst in an amount of 0.2-0.55 per hundred parts polyol,
v. at least one tin catalyst in an amount of 0.01-0.1 per hundred parts polyol,
vi. water in an amount of 1.5-3.3 per hundred parts polyol,
vii. at least one flame retardant in an amount of 6.5-14.0 per hundred parts polyol, and
viii. at least one flame retardant synergist in an amount of 8.0-20.0 per hundred parts polyol;
b) curing the mixture resulting from step a).

9) a) mixing together the following ingredients in the amounts specified:
i. at least one polyol having an average molecular weight of 6,000-12,000 Da, wherein the polyol has an OH functionality of 2-4,
ii. at least one methylene diphenyl diisocyanate having an NCO content of 26-33%, wherein the amount of diisocyanate relative to the amount of polyol is sufficient to give an ISO index of 73-105,
iii. at least one surfactant in an amount of 0.5-0.75 per hundred parts polyol,
iv. at least one amine catalyst in an amount of 0.2-0.55 per hundred parts polyol,
v. at least one of a chain extender and a cross-linker in an amount of 0.2-1.5 per hundred parts polyol,
vi. water in an amount of 1.5-3.3 per hundred parts polyol,
vii. at least one flame retardant in an amount of 6.5-14.0 per hundred parts polyol, and
viii. at least one flame retardant synergist in an amount of 8.0-20.0 per hundred parts polyol;
b) curing the mixture resulting from step a).

10) a) mixing together the following ingredients in the amounts specified:
i. at least one polyol having an average molecular weight of 6,000-12,000 Da, wherein the polyol has an OH functionality of 2-4,
ii. at least one methylene diphenyl diisocyanate having an NCO content of 26-33%, wherein the amount of diisocyanate relative to the amount of polyol is sufficient to give an ISO index of 73-105,
iii. at least one surfactant in an amount of 0.5-0.75 per hundred parts polyol,
iv. at least one amine catalyst in an amount of 0.2-0.55 per hundred parts polyol,
v. at least one of a chain extender and a cross-linker in an amount of 0.5-0.9 per hundred parts polyol,
vi. water in an amount of 1.5-3.3 per hundred parts polyol,
vii. at least one flame retardant in an amount of 6.5-14.0 per hundred parts polyol, and
viii. at least one flame retardant synergist in an amount of 8.0-20.0 per hundred parts polyol;
b) curing the mixture resulting from step a).

11) a) mixing together the following ingredients in the amounts specified:
i. at least one polyol having an average molecular weight of 6,000-12,000 Da, wherein the polyol has an OH functionality of 2-4,
ii. at least one methylene diphenyl diisocyanate having an NCO content of 26-33%, wherein the amount of diisocyanate relative to the amount of polyol is sufficient to give an ISO index of 73-105,
iii. at least one surfactant in an amount of 0.5-0.75 per hundred parts polyol,
iv. at least one amine catalyst in an amount of 0.2-0.55 per hundred parts polyol,
v. at least one cell opener in an amount of 1.0-6.0 per hundred parts polyol,
vi. water in an amount of 1.5-3.3 per hundred parts polyol,
vii. at least one flame retardant in an amount of 6.5-14.0 per hundred parts polyol, and
viii. at least one flame retardant synergist in an amount of 8.0-20.0 per hundred parts polyol;
b) curing the mixture resulting from step a).

12) a) mixing together the following ingredients in the amounts specified:
i. at least one polyol having an average molecular weight of 6,000-12,000 Da, wherein the polyol has an OH functionality of 2-4,
ii. at least one methylene diphenyl diisocyanate having an NCO content of 26-33%, wherein the amount of diisocyanate relative to the amount of polyol is sufficient to give an ISO index of 73-105, iii. at least one surfactant in an amount of 0.5-0.75 per hundred parts polyol,
iv. at least one amine catalyst in an amount of 0.2-0.55 per hundred parts polyol,
v. at least one cell opener in an amount of 2.0-5.5 per hundred parts polyol,
vi. water in an amount of 1.5-3.3 per hundred parts polyol,
vii. at least one flame retardant in an amount of 6.5-14.0 per hundred parts polyol, and
viii. at least one flame retardant synergist in an amount of 8.0-20.0 per hundred parts polyol;
b) curing the mixture resulting from step a).

13) a) mixing together the following ingredients in the amounts specified:
i. at least one polyol having an average molecular weight of 6,000-12,000 Da, wherein the polyol has an OH functionality of 2-4,
ii. at least one methylene diphenyl diisocyanate having an NCO content of 26-33%, wherein the amount of diisocyanate relative to the amount of polyol is sufficient to give an ISO index of 73-105,
iii. at least one surfactant in an amount of 0.5-0.75 per hundred parts polyol,
iv. at least one amine catalyst in an amount of 0.2-0.55 per hundred parts polyol,
v. at least one blowing agent in an amount of 1.0-10.0 per hundred parts polyol,
vi. water in an amount of 1.5-3.3 per hundred parts polyol,
vii. at least one flame retardant in an amount of 6.5-14.0 per hundred parts polyol, and
viii. at least one flame retardant synergist in an amount of 8.0-20.0 per hundred parts polyol;
b) curing the mixture resulting from step a).

14) a) mixing together the following ingredients in the amounts specified:
i. at least one polyol having an average molecular weight of 6,000-12,000 Da, wherein the polyol has an OH functionality of 2-4,
ii. at least one methylene diphenyl diisocyanate having an NCO content of 26-33%, wherein the amount of diisocyanate relative to the amount of polyol is sufficient to give an ISO index of 73-105,
iii. at least one surfactant in an amount of 0.5-0.75 per hundred parts polyol,
iv. at least one amine catalyst in an amount of 0.2-0.55 per hundred parts polyol,
v. at least one blowing agent in an amount of 1.5-8.0 per hundred parts polyol,
vi. water in an amount of 1.5-3.3 per hundred parts polyol,
vii. at least one flame retardant in an amount of 6.5-14.0 per hundred parts polyol, and
viii. at least one flame retardant synergist in an amount of 8.0-20.0 per hundred parts polyol;
b) curing the mixture resulting from step a).

15) a) mixing together the following ingredients in the amounts specified:
i. at least one polyol having an average molecular weight of 6,000-12,000 Da, wherein the polyol has an OH functionality of 2-4,
ii. at least one methylene diphenyl diisocyanate having an NCO content of 26-33%, wherein the amount of diisocyanate relative to the amount of polyol is sufficient to give an ISO index of 73-105,
iii. at least one surfactant in an amount of 0.5-0.75 per hundred parts polyol,
iv. at least one amine catalyst in an amount of 0.2-0.55 per hundred parts polyol,
v. at least one blowing agent in an amount of 1.0-10.0 per hundred parts polyol,
vi. at least one cell opener in an amount of 1.0-6.0 per hundred parts polyol,
vii. water in an amount of 1.5-3.3 per hundred parts polyol,
viii. at least one flame retardant in an amount of 6.5-14.0 per hundred parts polyol, and
ix. at least one flame retardant synergist in an amount of 8.0-20.0 per hundred parts polyol;
b) curing the mixture resulting from step a).

16) a) mixing together the following ingredients in the amounts specified:
i. at least one polyol having an average molecular weight of 6,000-12,000 Da, wherein the polyol has an OH functionality of 2-4,
ii. at least one methylene diphenyl diisocyanate having an NCO content of 26-33%, wherein the amount of diisocyanate relative to the amount of polyol is sufficient to give an ISO index of 73-105,
iii. at least one surfactant in an amount of 0.5-0.75 per hundred parts polyol,
iv. at least one amine catalyst in an amount of 0.2-0.55 per hundred parts polyol,
v. at least one blowing agent in an amount of 1.5-8.0 per hundred parts polyol,
vi. at least one cell opener in an amount of 2.0-5.5 per hundred parts polyol,
vii. water in an amount of 1.5-3.3 per hundred parts polyol,
viii. at least one flame retardant in an amount of 6.5-14.0 per hundred parts polyol, and
ix. at least one flame retardant synergist in an amount of 8.0-20.0 per hundred parts polyol;
b) curing the mixture resulting from step a).

17) a) mixing together the following ingredients in the amounts specified:
i. at least one polyol having an average molecular weight of 6,000-12,000 Da, wherein the polyol has an OH functionality of 2-4,
ii. at least one methylene diphenyl diisocyanate having an NCO content of 26-33%, wherein the amount of diisocyanate relative to the amount of polyol is sufficient to give an ISO index of 73-105,
iii. at least one surfactant in an amount of 0.5-0.75 per hundred parts polyol,
iv. at least one amine catalyst in an amount of 0.2-0.55 per hundred parts polyol,
v. at least one tin catalyst in an amount of 0.01-0.2 per hundred parts polyol,
vi. at least one of a chain extender and a cross-linker in an amount of 0.2-1.5 per hundred parts polyol,
vii. water in an amount of 1.5-3.3 per hundred parts polyol,
viii. at least one flame retardant in an amount of 6.5-14.0 per hundred parts polyol, and
ix. at least one flame retardant synergist in an amount of 8.0-20.0 per hundred parts polyol;
b) curing the mixture resulting from step a).

18) a) mixing together the following ingredients in the amounts specified:

i. at least one polyol having an average molecular weight of 6,000-12,000 Da, wherein the polyol has an OH functionality of 2-4,
ii. at least one methylene diphenyl diisocyanate having an NCO content of 26-33%, wherein the amount of diisocyanate relative to the amount of polyol is sufficient to give an ISO index of 73-105,
iii. at least one surfactant in an amount of 0.5-0.75 per hundred parts polyol,
iv. at least one amine catalyst in an amount of 0.2-0.55 per hundred parts polyol,
v. at least one tin catalyst in an amount of 0.01-0.1 per hundred parts polyol,
vi. at least one of a chain extender and a cross-linker in an amount of 0.5-0.9 per hundred parts polyol,
vii. water in an amount of 1.5-3.3 per hundred parts polyol,
viii. at least one flame retardant in an amount of 6.5-14.0 per hundred parts polyol, and
ix. at least one flame retardant synergist in an amount of 8.0-20.0 per hundred parts polyol;
b) curing the mixture resulting from step a).

19) a) mixing together the following ingredients in the amounts specified:
i. at least one polyol having an average molecular weight of 6,000-12,000 Da, wherein the polyol has an OH functionality of 2-4,
ii. at least one methylene diphenyl diisocyanate having an NCO content of 26-33%, wherein the amount of diisocyanate relative to the amount of polyol is sufficient to give an ISO index of 73-105,
iii. at least one surfactant in an amount of 0.5-0.75 per hundred parts polyol,
iv. at least one amine catalyst in an amount of 0.2-0.55 per hundred parts polyol,
v. at least one tin catalyst in an amount of 0.01-0.2 per hundred parts polyol,
vi. at least one of a chain extender and a cross-linker in an amount of 0.2-1.5 per hundred parts polyol,
vii. at least one blowing agent in an amount of 1.0-10.0 per hundred parts polyol,
viii. at least one cell opener in an amount of 1.0-6.0 per hundred parts polyol,
ix. water in an amount of 1.5-3.3 per hundred parts polyol,
x. at least one flame retardant in an amount of 6.5-14.0 per hundred parts polyol, and
xi. at least one flame retardant synergist in an amount of 8.0-20.0 per hundred parts polyol;
b) curing the mixture resulting from step a).

20) a) mixing together the following ingredients in the amounts specified:
i. at least one polyol having an average molecular weight of 6,000-12,000 Da, wherein the polyol has an OH functionality of 2-4,
ii. at least one methylene diphenyl diisocyanate having an NCO content of 26-33%, wherein the amount of diisocyanate relative to the amount of polyol is sufficient to give an ISO index of 73-105,
iii. at least one surfactant in an amount of 0.5-0.75 per hundred parts polyol,
iv. at least one amine catalyst in an amount of 0.2-0.55 per hundred parts polyol,
v. at least one tin catalyst in an amount of 0.01-0.1 per hundred parts polyol,
vi. at least one of a chain extender and a cross-linker in an amount of 0.5-0.9 per hundred parts polyol,
vii. at least one blowing agent in an amount of 1.5-8.0 per hundred parts polyol,
viii. at least one cell opener in an amount of 2.0-5.5 per hundred parts polyol,
ix. water in an amount of 1.5-3.3 per hundred parts polyol,
x. at least one flame retardant in an amount of 6.5-14.0 per hundred parts polyol, and
xi. at least one flame retardant synergist in an amount of 8.0-20.0 per hundred parts polyol;
b) curing the mixture resulting from step a).

21) a) mixing together the following ingredients in the amounts specified:
i. at least one polyol having an average molecular weight of 6,000-12,000 Da, wherein the polyol has an OH functionality of 2-4,
ii. at least one methylene diphenyl diisocyanate having an NCO content of 26-33%, wherein the amount of diisocyanate relative to the amount of polyol is sufficient to give an ISO index of 73-105,
iii. at least one surfactant in an amount of 0.5-0.75 per hundred parts polyol,
iv. at least one amine catalyst in an amount of 0.2-0.55 per hundred parts polyol,
v. at least one tin catalyst in an amount of 0.01-0.1 per hundred parts polyol,
vi. at least one of a chain extender and a cross-linker in an amount of 0.5-0.9 per hundred parts polyol,
vii. at least one blowing agent in an amount of 1.5-8.0 per hundred parts polyol,
viii. at least one cell opener in an amount of 2.0-5.5 per hundred parts polyol,
ix. water in an amount of 1.5-3.3 per hundred parts polyol,
x. at least one flame retardant in an amount of 6.5-14.0 per hundred parts polyol, and
xi. at least one flame retardant synergist in an amount of 9.0-17.0 per hundred parts polyol;
b) curing the mixture resulting from step a).

22) a) mixing together the following ingredients in the amounts specified:
i. at least one polyol having an average molecular weight of 6,000-12,000 Da, wherein the polyol has an OH functionality of 2-4,
ii. at least one methylene diphenyl diisocyanate having an NCO content of 26-33%, wherein the amount of diisocyanate relative to the amount of polyol is sufficient to give an ISO index of 87-95,
iii. at least one surfactant in an amount of 0.55-0.75 per hundred parts polyol,
iv. at least one amine catalyst in an amount of 0.45-0.55 per hundred parts polyol,
v. at least one tin catalyst in an amount of 0.01-0.1 per hundred parts polyol,
vi. at least one of a chain extender and a cross-linker in an amount of 0.5-0.9 per hundred parts polyol,
vii. at least one blowing agent in an amount of 1.5-8.0 per hundred parts polyol,
viii. at least one cell opener in an amount of 2.0-5.5 per hundred parts polyol,
ix. water in an amount of 1.75-2.8 per hundred parts polyol,
x. at least one flame retardant in an amount of 8.0-13.5 per hundred parts polyol, and
xi. at least one flame retardant synergist in an amount of 9.0-17.0 per hundred parts polyol;
b) curing the mixture resulting from step a).

23) a) mixing together the following ingredients in the amounts specified:
   i. at least one polyol having an average molecular weight of 6,000-12,000 Da, wherein the polyol has an OH functionality of 2-4,
   ii. at least one methylene diphenyl diisocyanate having an NCO content of 26-33%, wherein the amount of diisocyanate relative to the amount of polyol is sufficient to give an ISO index of 87-95,
   iii. at least one surfactant in an amount of 0.55-0.8 per hundred parts polyol,
   iv. at least one amine catalyst in an amount of 0.45-0.55 per hundred parts polyol,
   v. at least one tin catalyst in an amount of 0.01-0.1 per hundred parts polyol,
   vi. at least one of a chain extender and a cross-linker in an amount of 0.5-0.9 per hundred parts polyol,
   vii. at least one blowing agent in an amount of 1.5-8.0 per hundred parts polyol,
   viii. at least one cell opener in an amount of 2.0-5.5 per hundred parts polyol,
   ix. water in an amount of 1.75-2.6 per hundred parts polyol,
   x. at least one flame retardant in an amount of 8.0-13.5 per hundred parts polyol, and
   xi. at least one flame retardant synergist in an amount of 9.0-17.0 per hundred parts polyol;
b) curing the mixture resulting from step a).

24) a) mixing together the following ingredients in the amounts specified:
   i. at least one polyol having an average molecular weight of 6,000-12,000 Da, wherein the polyol has an OH functionality of 2-4,
   ii. at least one methylene diphenyl diisocyanate having an NCO content of 26-33%, wherein the amount of diisocyanate relative to the amount of polyol is sufficient to give an ISO index of 88-92,
   iii. at least one surfactant in an amount of 0.55-0.75 per hundred parts polyol,
   iv. at least one amine catalyst in an amount of 0.45-0.55 per hundred parts polyol,
   v. at least one tin catalyst in an amount of 0.01-0.1 per hundred parts polyol,
   vi. at least one of a chain extender and a cross-linker in an amount of 0.5-0.9 per hundred parts polyol,
   vii. at least one blowing agent in an amount of 1.5-8.0 per hundred parts polyol,
   viii. at least one cell opener in an amount of 2.0-5.5 per hundred parts polyol,
   ix. water in an amount of 1.75-2.5 per hundred parts polyol,
   x. at least one flame retardant in an amount of 10.0-13.0 per hundred parts polyol, and
   xi. at least one flame retardant synergist in an amount of 13.0-16.0 per hundred parts polyol;
b) curing the mixture resulting from step a).

25) a) mixing together the following ingredients in the amounts specified:
   i. at least one polyol having an average molecular weight of 6,000-12,000 Da, wherein the polyol has an OH functionality of 2-4,
   ii. at least one methylene diphenyl diisocyanate having an NCO content of 26-33%, wherein the amount of diisocyanate relative to the amount of polyol is sufficient to give an ISO index of 88-92,
   iii. at least one surfactant in an amount of 0.55-0.85 per hundred parts polyol,
   iv. at least one amine catalyst in an amount of 0.45-0.55 per hundred parts polyol,
   v. at least one tin catalyst in an amount of 0.01-0.6 per hundred parts polyol,
   vi. at least one of a chain extender and a cross-linker in an amount of 0.5-0.9 per hundred parts polyol,
   vii. at least one blowing agent in an amount of 1.5-8.0 per hundred parts polyol,
   viii. at least one cell opener in an amount of 2.0-5.5 per hundred parts polyol,
   ix. water in an amount of 1.75-2.5 per hundred parts polyol,
   x. optionally at least one flame retardant in an amount of 10.0-13.0 per hundred parts polyol, and
   xi. optionally at least one flame retardant synergist in an amount of 13.0-16.0 per hundred parts polyol;
b) curing the mixture resulting from step a).

26) a) mixing together the following ingredients in the amounts specified:
   i. at least one polyol having an average molecular weight of 6,000-12,000 Da, wherein the polyol has an OH functionality of 2-4,
   ii. at least one methylene diphenyl diisocyanate having an NCO content of 26-33%, wherein the amount of diisocyanate relative to the amount of polyol is sufficient to give an ISO index of 73-77,
   iii. at least one surfactant in an amount of 0.45-0.65 per hundred parts polyol,
   iv. at least one amine catalyst in an amount of 0.2-0.4 per hundred parts polyol,
   v. at least one tin catalyst in an amount of 0.01-0.05 per hundred parts polyol,
   vi. at least one of a chain extender and a cross-linker in an amount of 0.7-0.9 per hundred parts polyol,
   vii. at least one blowing agent in an amount of 5.0-9.0 per hundred parts polyol,
   viii. at least one cell opener in an amount of 2.0-5.5 per hundred parts polyol,
   ix. water in an amount of 3.0-3.4 per hundred parts polyol,
   x. at least one flame retardant in an amount of 5.0-9.0 per hundred parts polyol, and
   xi. at least one flame retardant synergist in an amount of 8.0-12.0 per hundred parts polyol;
b) curing the mixture resulting from step a).

27) a) mixing together the following ingredients in the amounts specified:
   i. at least one polyol having an average molecular weight of 6,000-12,000 Da, wherein the polyol has an OH functionality of 2-4,
   ii. at least one methylene diphenyl diisocyanate having an NCO content of 26-33%, wherein the amount of diisocyanate relative to the amount of polyol is sufficient to give an ISO index of 88-92,
   iii. at least one surfactant in an amount of 0.55-0.85 per hundred parts polyol,
   iv. at least one amine catalyst in an amount of 0.4-0.6 per hundred parts polyol,
   v. at least one tin catalyst in an amount of 0.03-0.07 per hundred parts polyol,
   vi. at least one of a chain extender and a cross-linker in an amount of 0.45-0.75 per hundred parts polyol,
   vii. at least one blowing agent in an amount of 3.5-7.5 per hundred parts polyol, viii. at least one cell opener in an amount of 2.0-5.5 per hundred parts polyol,
ix. water in an amount of 1.8-2.2 per hundred parts polyol,
x. at least one flame retardant in an amount of 2.0-4.0 per hundred parts polyol, and
xi. at least one flame retardant synergist in an amount of 13.0-17.0 per hundred parts polyol;
b) curing the mixture resulting from step a).

28) a) mixing together the following ingredients in the amounts specified:
i. at least one polyol having an average molecular weight of 6,000-12,000 Da, wherein the polyol has an OH functionality of 2-4,
ii. at least one methylene diphenyl diisocyanate having an NCO content of 26-33%, wherein the amount of diisocyanate relative to the amount of polyol is sufficient to give an ISO index of 88-92,
iii. at least one surfactant in an amount of 0.55-0.85 per hundred parts polyol,
iv. at least one amine catalyst in an amount of 0.4-0.6 per hundred parts polyol,
v. at least one tin catalyst in an amount of 0.03-0.07 per hundred parts polyol,
vi. at least one of a chain extender and a cross-linker in an amount of 0.45-0.75 per hundred parts polyol,
vii. at least one blowing agent in an amount of 3.5-7.5 per hundred parts polyol,
viii. at least one cell opener in an amount of 2.0-5.5 per hundred parts polyol,
ix. water in an amount of 3.8-4.0 per hundred parts polyol,
x. at least one flame retardant in an amount of 10.5-13.5 per hundred parts polyol, and
xi. at least one flame retardant synergist in an amount of 13.0-17.0 per hundred parts polyol;
b) curing the mixture resulting from step a).

29) a) mixing together the following ingredients in the amounts specified:
i. at least one polyol having an average molecular weight of 6,000-12,000 Da, wherein the polyol has an OH functionality of 2-4,
ii. at least one methylene diphenyl diisocyanate having an NCO content of 26-33%, wherein the amount of diisocyanate relative to the amount of polyol is sufficient to give an ISO index of 88-92,
iii. at least one surfactant in an amount of 0.55-0.85 per hundred parts polyol,
iv. at least one amine catalyst in an amount of 0.4-0.6 per hundred parts polyol,
v. at least one tin catalyst in an amount of 0.03-0.07 per hundred parts polyol,
vi. at least one of a chain extender and a cross-linker in an amount of 0.45-0.75 per hundred parts polyol,
vii. at least one blowing agent in an amount of 3.5-7.5 per hundred parts polyol,
viii. at least one cell opener in an amount of 2.0-5.5 per hundred parts polyol,
ix. water in an amount of 1.8-2.0 per hundred parts polyol,
x. at least one flame retardant in an amount of 10.5-13.5 per hundred parts polyol, and
xi. at least one flame retardant synergist in an amount of 13.0-17.0 per hundred parts polyol;
b) curing the mixture resulting from step a).

30) a) mixing together the following ingredients in the amounts specified:
i. at least one polyol having an average molecular weight of 6,000-12,000 Da, wherein the polyol has an OH functionality of 2-4,
ii. at least one methylene diphenyl diisocyanate having an NCO content of 26-33%, wherein the amount of diisocyanate relative to the amount of polyol is sufficient to give an ISO index of 88-92,
iii. at least one surfactant in an amount of 0.55-0.85 per hundred parts polyol,
iv. at least one amine catalyst in an amount of 0.4-0.6 per hundred parts polyol,
v. at least one tin catalyst in an amount of 0.03-0.07 per hundred parts polyol,
vi. at least one of a chain extender and a cross-linker in an amount of 0.45-0.75 per hundred parts polyol,
vii. at least one blowing agent in an amount of 1.0-per hundred parts polyol,
viii. at least one cell opener in an amount of 4.5-5.5 per hundred parts polyol, and
ix. water in an amount of 1.8-2.0 per hundred parts polyol,
b) curing the mixture resulting from step a).

In any of the numbered paragraphs (1)-(30), the polyol, methylene diphenyl diisocyanate, surfactant, amine catalyst, water, flame retardant, flame retardant synergist, tin catalyst, chain extender/cross linker, cell opener and/or blowing agent may have any of the definitions recited hereinbefore.

In an embodiment, in any of the numbered paragraphs (1)-(30), the polyol, which is suitably a polyether polyol, has a molecular weight of 7,000-9,000 Da or 7,500-8,500 Da. Suitably, the polyol has a molecular weight of 7,000-9,000 Da or 7,750-8,250 Da.

In an embodiment, in any of the numbered paragraphs (1)-(30), the polyol has an OH value of 20-48 or 26-30.

In an embodiment, in any of the numbered paragraphs (1)-(30), only one polyol is provided in step a).

In an embodiment, in any of the numbered paragraphs (1)-(30), the polyol has a molecular weight of 7,500-8,500 Da and an OH value of 26-30.

In an embodiment, in any of the numbered paragraphs (1)-(30), the methylene diphenyl diisocyanate has an NCO content of 28-33% or 29-32%. Suitably, the methylene diphenyl diisocyanate has an NCO content of 29-31%. Most suitably, the methylene diphenyl diisocyanate has an NCO content of 29-30.5%.

In an embodiment, in any of the numbered paragraphs (1)-(30), the methylene diphenyl diisocyanate is a modified methylene diphenyl diisocyanate having a density at 25° C. of 1.1-1.3 gcm$^{-3}$, a viscosity at 25° C. of 55-75 mPa s, and a flash point at 25° C. of 195-215° C.

In an embodiment, in any of the numbered paragraphs (1)-(30), the methylene diphenyl diisocyanate is the only isocyanate used in step a).

In an embodiment, in any of the numbered paragraphs (1)-(30), the surfactant is a silicone oil.

In an embodiment, in any of the numbered paragraphs (1)-(30), the amine catalyst is suitable for enhancing the nucleophilicity of the polyol.

In an embodiment, in any of the numbered paragraphs (1)-(30), the flame retardant is a chlorinated phosphate ester, a halogen-free phosphate ester, or a mixture thereof.

In an embodiment, in any of the numbered paragraphs (1)-(30), the flame retardant synergist is melamine or melamine-based.

In an embodiment, in any of the numbered paragraphs (1)-(30), the tin catalyst is a tin alkyl carboxylate.

In an embodiment, in any of the numbered paragraphs (1)-(30), the chain extender and/or cross linker is selected from ethylene glycol, 1,4-butanediol, ethanol amine and diethanol amine.

In an embodiment, in any of the numbered paragraphs (1)-(30), the cell opener is a polyol-based compound.

In an embodiment, in any of the numbered paragraphs (1)-(30), the blowing agent is methylene chloride.

In an embodiment, in any of the numbered paragraphs (1)-(30),
the polyol has a molecular weight of 7,000-9,000 Da and an OH value of 20-48, and the methylene diphenyl diisocyanate has an NCO content of 28-33%.

In an embodiment, in any of the numbered paragraphs (1)-(30),
the polyol has a molecular weight of 7,500-8,500 Da and an OH value of 20-48, and
the methylene diphenyl diisocyanate has an NCO content of 29-32%.

In an embodiment, in any of the numbered paragraphs (1)-(30),
the polyol has a molecular weight of 7,500-8,500 Da and an OH value of 26-30, and
the methylene diphenyl diisocyanate has an NCO content of 29-32%.

In an embodiment, in any of the numbered paragraphs (1)-(30),
the polyol has a molecular weight of 7,500-8,500 Da and an OH value of 26-30, and
the methylene diphenyl diisocyanate is a modified methylene diphenyl diisocyanate having a density at 25° C. of 1.1-1.3 gcm$^{-3}$, a viscosity at 25° C. of 55-75 mPa s, a flash point at 25° C. of 195-215° C., and an NCO content of 29-32%.

In an embodiment, in any of the numbered paragraphs (1)-(30),
the polyol has a molecular weight of 7,000-9,000 Da and an OH value of 20-48,
the methylene diphenyl diisocyanate has an NCO content of 29-32%, and
the surfactant is a silicone oil.

In an embodiment, in any of the numbered paragraphs (1)-(30),
the polyol has a molecular weight of 7,000-9,000 Da and an OH value of 20-48,
the methylene diphenyl diisocyanate has an NCO content of 29-32%,
the surfactant is a silicone oil, and
the amine catalyst is suitable for enhancing the nucleophilicity of the polyol.

In an embodiment, in any of the numbered paragraphs (1)-(30),
the polyol has a molecular weight of 7,000-9,000 Da and an OH value of 20-48,
the methylene diphenyl diisocyanate has an NCO content of 29-32%,
the surfactant is a silicone oil,
the amine catalyst is suitable for enhancing the nucleophilicity of the polyol, and
the flame retardant is a chlorinated phosphate ester, a halogen-free phosphate ester, or a mixture thereof.

In an embodiment, in any of the numbered paragraphs (1)-(30),
the polyol has a molecular weight of 7,000-9,000 Da and an OH value of 20-48,
the methylene diphenyl diisocyanate has an NCO content of 29-32%,
the surfactant is a silicone oil,
the amine catalyst is suitable for enhancing the nucleophilicity of the polyol,
the flame retardant is a chlorinated phosphate ester, a halogen-free phosphate ester, or a mixture thereof, and
the flame retardant synergist is melamine or melamine-based.

In an embodiment, in any of the numbered paragraphs (1)-(30),
the polyol has a molecular weight of 7,000-9,000 Da and an OH value of 20-48,
the methylene diphenyl diisocyanate has an NCO content of 29-32%,
the surfactant is a silicone oil,
the amine catalyst is suitable for enhancing the nucleophilicity of the polyol,
the flame retardant is a chlorinated phosphate ester, a halogen-free phosphate ester, or a mixture thereof,
the flame retardant synergist is melamine or melamine-based, and tin catalyst is a tin alkyl carboxylate.

In an embodiment, in any of the numbered paragraphs (1)-(30),
the polyol has a molecular weight of 7,000-9,000 Da and an OH value of 20-48,
the methylene diphenyl diisocyanate has an NCO content of 29-32%,
the surfactant is a silicone oil,
the amine catalyst is suitable for enhancing the nucleophilicity of the polyol,
the flame retardant is a chlorinated phosphate ester, a halogen-free phosphate ester, or a mixture thereof,
the flame retardant synergist is melamine or melamine-based,
tin catalyst is a tin alkyl carboxylate, and
the chain extender and/or cross linker is selected from ethylene glycol, 1,4-butanediol, ethanol amine and diethanol amine.

In an embodiment, in any of the numbered paragraphs (1)-(30),
the polyol has a molecular weight of 7,000-9,000 Da and an OH value of 20-48,
the methylene diphenyl diisocyanate has an NCO content of 29-32%,
the surfactant is a silicone oil,
the amine catalyst is suitable for enhancing the nucleophilicity of the polyol,
the flame retardant is a chlorinated phosphate ester, a halogen-free phosphate ester, or a mixture thereof,
the flame retardant synergist is melamine or melamine-based,
tin catalyst is a tin alkyl carboxylate,
the chain extender and/or cross linker is selected from ethylene glycol, 1,4-butanediol, ethanol amine and diethanol amine,
the cell opener is a polyol-based compound, and
the blowing agent is methylene chloride.

In an embodiment, in any of the numbered paragraphs (1)-(30),
the polyol has a molecular weight of 7,500-8,500 Da (or 7,250-8,250 Da) and an OH value of 26-30,
the methylene diphenyl diisocyanate has an NCO content of 29-32%, and
the surfactant is a silicone oil.

In an embodiment, in any of the numbered paragraphs (1)-(30),
the polyol has a molecular weight of 7,500-8,500 Da (or 7,250-8,250 Da) and an OH value of 26-30, the methylene diphenyl diisocyanate has an NCO content of 29-32%,
the surfactant is a silicone oil, and
the amine catalyst is suitable for enhancing the nucleophilicity of the polyol.

In an embodiment, in any of the numbered paragraphs (1)-(30),
the polyol has a molecular weight of 7,500-8,500 Da (or 7,250-8,250 Da) and an OH value of 26-30,
the methylene diphenyl diisocyanate has an NCO content of 29-32%,
the surfactant is a silicone oil,
the amine catalyst is suitable for enhancing the nucleophilicity of the polyol, and
the flame retardant is a chlorinated phosphate ester, a halogen-free phosphate ester, or a mixture thereof.

In an embodiment, in any of the numbered paragraphs (1)-(30),
the polyol has a molecular weight of 7,500-8,500 Da (or 7,250-8,250 Da) and an OH value of 26-30,
the methylene diphenyl diisocyanate has an NCO content of 29-32%,
the surfactant is a silicone oil,
the amine catalyst is suitable for enhancing the nucleophilicity of the polyol,
the flame retardant is a chlorinated phosphate ester, a halogen-free phosphate ester, or a mixture thereof, and
the flame retardant synergist is melamine or melamine-based.

In an embodiment, in any of the numbered paragraphs (1)-(30),
the polyol has a molecular weight of 7,500-8,500 Da (or 7,250-8,250 Da) and an OH value of 26-30,
the methylene diphenyl diisocyanate has an NCO content of 29-32%,
the surfactant is a silicone oil,
the amine catalyst is suitable for enhancing the nucleophilicity of the polyol,
the flame retardant is a chlorinated phosphate ester, a halogen-free phosphate ester, or a mixture thereof,
the flame retardant synergist is melamine or melamine-based, and
tin catalyst is a tin alkyl carboxylate.

In an embodiment, in any of the numbered paragraphs (1)-(30),
the polyol has a molecular weight of 7,500-8,500 Da (or 7,250-8,250 Da) and an OH value of 26-30,
the methylene diphenyl diisocyanate has an NCO content of 29-32%,
the surfactant is a silicone oil,
the amine catalyst is suitable for enhancing the nucleophilicity of the polyol,
the flame retardant is a chlorinated phosphate ester, a halogen-free phosphate ester, or a mixture thereof,
the flame retardant synergist is melamine or melamine-based,
tin catalyst is a tin alkyl carboxylate, and
the chain extender and/or cross linker is selected from ethylene glycol, 1,4-butanediol, ethanol amine and diethanol amine.

In an embodiment, in any of the numbered paragraphs (1)-(30),
the polyol has a molecular weight of 7,500-8,500 Da (or 7,250-8,250 Da) and an OH value of 26-30,
the methylene diphenyl diisocyanate has an NCO content of 29-32%,
the surfactant is a silicone oil,
the amine catalyst is suitable for enhancing the nucleophilicity of the polyol,
the flame retardant is a chlorinated phosphate ester, a halogen-free phosphate ester, or a mixture thereof,
the flame retardant synergist is melamine or melamine-based,
tin catalyst is a tin alkyl carboxylate,
the chain extender and/or cross linker is selected from ethylene glycol, 1,4-butanediol, ethanol amine and diethanol amine,
the cell opener is a polyol-based compound, and
the blowing agent is methylene chloride.

In any of the embodiments based on numbered paragraphs (1)-(30), the ingredients specified in step a) are mixed at a speed of 2,000-8,000 rpm, preferably 4,000-6,000 rpm.

In any of the embodiments based on numbered paragraphs (1)-(30), in step a), the polyol, methylene diphenyl diisocyanate, surfactant, amine catalysts, water, flame retardant, flame retardant synergist, blowing agent, tin catalyst, cell opener and/or chain extender/cross linker may be fed to a mixer at any of the rates specified hereinbefore.

In any of the embodiments based on numbered paragraphs (1)-(30), in step a),
the polyol is fed to a mixer at a rate of 100-140 kg/min, and
the methylene diphenyl diisocyanate is fed to a mixer at a rate of 30-80 kg/min.

In any of the embodiments based on numbered paragraphs (1)-(30), in step a),
the polyol is fed to a mixer at a rate of 100-140 kg/min,
the methylene diphenyl diisocyanate is fed to a mixer at a rate of 30-80 kg/min,
the surfactant is fed to a mixer at a rate of 45-85 kg/min,
the amine catalyst is fed to a mixer at a rate of 20-50 kg/min, and
water is fed to a mixer at a rate of 2-6 kg/min.

In any of the embodiments based on numbered paragraphs (1)-(30), in step a),
the polyol is fed to a mixer at a rate of 100-140 kg/min,
the methylene diphenyl diisocyanate is fed to a mixer at a rate of 30-80 kg/min,
the surfactant is fed to a mixer at a rate of 45-85 kg/min,
the amine catalyst is fed to a mixer at a rate of 20-50 kg/min,
water is fed to a mixer at a rate of 2-6 kg/min, and
the flame retardant is fed to a mixer at a rate of 5-12 kg/min.

In any of the embodiments based on numbered paragraphs (1)-(30), in step a),
the polyol is fed to a mixer at a rate of 100-140 kg/min,
the methylene diphenyl diisocyanate is fed to a mixer at a rate of 30-80 kg/min,
the surfactant is fed to a mixer at a rate of 45-85 kg/min,
the amine catalyst is fed to a mixer at a rate of 20-50 kg/min,
water is fed to a mixer at a rate of 2-6 kg/min,
the flame retardant is fed to a mixer at a rate of 5-12 kg/min,
the flame retardant synergist is fed to a mixer at a rate of 8-16 kg/min,
the blowing agent is fed to a mixer at a rate of 5-12 kg/min,
tin catalyst is fed to a mixer at a rate of 0.01-0.07 kg/min,
the cell opener is fed to a mixer at a rate of 1-6 kg/min, and
the chain extender and/or cross linker is fed to a mixer at a rate of 0.1-3.0 kg/min.

In any of the embodiments based on numbered paragraphs (1)-(30), in step b), the mixture resulting from step a) is cured in an atmosphere of air at a temperature of 15-40° C.

Polyurethane Foam

As described hereinbefore, the present invention provides a polyurethane foam obtainable by the process according to the first aspect of the invention.

As described hereinbefore, the present invention provides a polyurethane foam having a sag value of 2.8-3.5, wherein the sag value is calculated according to the following expression:

$$\text{Sag value} = \frac{IFD65\%}{IFD25\%}$$

and wherein IFD65% and IFD25% values are determined according to the protocol set forth in ISO 2439:2008.

The flexible polyurethane foams of the present invention offer a variety of surprising advantages over known polyurethane foams. Perhaps most notably, the present invention has allowed certain desirable properties exhibited across conventional, HR and visco-elastic flexible polyurethane foams to be brought together into a single polyurethane foam. In particular, the foams of the present invention combine the support and pressure-reducing characteristics of conventional, HR and visco-elastic foam, whilst simultaneously offering noticeably improved surface smoothness and softness. Such characteristics are attributable, at least in part, to the unique load bearing properties of the foams of the present invention. In particular, the present foams exhibit a high degree of surface softness and smoothness upon initial application of pressure to the foam's surface. However, upon continued application of pressure, the foam's resistance to compression increases sharply, thus offering increased resilience and support. As a consequence, the present foams are not only well-suited to applications requiring robust support, such as in seats and mattress bases, but are equally useful in articles that are intended to be pleasing to the touch, such as mattress surfaces and mattress toppers.

The following paragraphs are applicable to the polyurethane foams of both the second and third aspects of the invention.

The polyurethane foam has a sag value of 2.8-3.5. The sag value is a parameter commonly used in the foam industry to describe the load bearing characteristics of a given foam. With this industry, the sag value is calculated according to the following expression:

$$\text{Sag value} = \frac{IFD65\%}{IFD25\%}$$

IFD (indentation force deflection, previously indentation load deflection) is one test method to determine the load bearing characteristics (firmness or stiffness) of a foam, and is expressed in Newtons at a given percent deflection of the foam. To obtain the IFD25% value, a 200 mm diameter flat circular indenter plate is driven into a square foam sample (380 mm side length, 50 mm thickness), stopping when it reaches a deflection of 12.5 mm (25% of the 50 mm thickness). The testing device records the force required to hold this foam indented for 30 seconds. The higher the force reading, the higher the load bearing capacity of the foam. The ISO Standard entitled "Flexible cellular polymeric materials—Determination of hardness (indentation technique) (ISO 2439:2008) English version of DIN EN ISO 2439:2009-05" (referred to generally herein as ISO 2439:2008) provides further details of how IFD and sag value are calculated at paragraph 7.4 Method B.

The sag value (also known as sag factor or compressive deflection coefficient) is the ratio of the IFD65% value to the IFD25% value and is expressed in real numbers with one decimal. The sag value gives an indication of cushioning quality, and a high value indicates a resistance to "bottoming out." The sag value properties of the present foams reflects the advantageous load bearing properties discussed above.

In an embodiment, the polyurethane foam has a sag value of 3.0-3.5. Suitably, the polyurethane foam has a sag value of 3.1-3.4. More suitably, the polyurethane foam has a sag value of 3.2-3.4.

In an embodiment, the polyurethane foam has an IFD25% value of 10-40. Suitably, the polyurethane foam has an IFD25% value of 20-30.

In an embodiment, the polyurethane foam has an IFD40% value of 33-80. Suitably, the polyurethane foam has an IFD40% value of 40-70. More suitably, the polyurethane foam has an IFD40% value of 40-55.

Alternatively, polyurethane foam has an IFD40% value of 20-50. Suitably, the polyurethane foam has an IFD40% value of 30-40.

In an embodiment, the polyurethane foam has an IFD65% value of 50-115. Suitably, the polyurethane foam has an IFD65% value of 50-100. More suitably, the polyurethane foam has an IFD65% value of 70-95. Most suitably, the polyurethane foam has an IFD65% value of 72-85.

Alternatively, the polyurethane foam has an IFD65% value of 60-90. Suitably, the polyurethane foam has an IFD65% value of 65-75.

In an embodiment, the polyurethane foam has a density of 35-60 kg/m$^3$. Suitably, the polyurethane foam has a density of 40-60 kg/m$^3$. More suitably, the polyurethane foam has a density of 40-55 kg/m$^3$. Even more suitably, the polyurethane foam has a density of 45-50 kg/m$^3$.

In an embodiment, the polyurethane foam has a ball resilience of >60% (e.g. 60-72%). Ball resilience was tested according to the protocol outlined in ISO standard 8307: 1990(E). The test pieces were conditioned and tested at a temperature of 23±2° C. and a humidity of 55±10%.

In an embodiment, the polyurethane foam comprises a polyurethane formed by the reaction of at least one polyol having a molecular weight of 6,000-12,000 Da and an OH functionality of 2-4 with at least one methylene diphenyl diisocyanate having an NCO content of 26-33%. The polyol and methylene diphenyl diisocyanate may have any one or more of those definitions discussed in respect of the first aspect of the invention.

In an embodiment, the polyurethane foam comprises one or more of a chlorinated phosphate ester and a halogen-free phosphate ester fire retardant, or a residue thereof.

In an embodiment, the polyurethane foam exhibits BS5852 Crib5 fire retardancy. BS5852 Crib5 fire retardancy is a UK requirement which is perhaps the most stringent of all international flame retardancy standards. British Standard BS5852 Part 2 1982 entitled "Fire tests for furniture, Part 2. Methods of test for the ignitability of upholstered composites for seating by flaming sources" describes that in the Crib5 test, a wooded crib, made of dry wood stacked in a lattice formation weighing about 17 g, is used as the ignition source and is lowered onto the test material and ignited with a match. If no flaming or progressive smouldering is observed on both cover and interior material and flames self-extinguish within 10 mins, and the mass loss of the test foam pieces is less than 60 g, the test is recorded as 'positive' and the material passes the test. Further details of the test are provided in British Standard BS5852 Part 2 1982.

Achieving high surface-softness, high sag value and BS5852 crib 5 compliance in a single polyurethane foam is particularly advantageous.

In an embodiment, the polyurethane foam exhibits a mass loss of <50 g during the BS5852 Crib5 test. Suitably, the polyurethane foam exhibits a mass loss of <40 g during the BS5852 Crib5 test. More suitably, the polyurethane foam exhibits a mass loss of <36 g during the BS5852 Crib5 test.

In an embodiment, the polyurethane foam is as defined in any one of numbered paragraphs (31)-(51) below:

31) the polyurethane foam has:
    an IFD25% value of 10-40,
    an IFD40% value of 33-80,
    an IFD65% value of 50-115, and
    the IFD25% and IFD65% values are such that the sag value is 3.0-3.5.
32) the polyurethane foam has:
    an IFD25% value of 20-30,
    an IFD40% value of 33-80,
    an IFD65% value of 50-115, and
    the IFD25% and IFD65% values are such that the sag value is 3.0-3.5.
33) the polyurethane foam has:
    an IFD25% value of 10-40,
    an IFD40% value of 40-70,
    an IFD65% value of 50-115, and
    the IFD25% and IFD65% values are such that the sag value is 3.0-3.5.
34) the polyurethane foam has:
    an IFD25% value of 10-40,
    an IFD40% value of 40-55,
    an IFD65% value of 50-115, and
    the IFD25% and IFD65% values are such that the sag value is 3.0-3.5.
35) the polyurethane foam has:
    an IFD25% value of 10-40,
    an IFD40% value of 33-80,
    an IFD65% value of 70-95, and
    the IFD25% and IFD65% values are such that the sag value is 3.0-3.5.
36) the polyurethane foam has:
    an IFD25% value of 10-40,
    an IFD40% value of 33-80,
    an IFD65% value of 72-85, and
    the IFD25% and IFD65% values are such that the sag value is 3.0-3.5.
37) the polyurethane foam has:
    an IFD25% value of 20-30,
    an IFD40% value of 33-80,
    an IFD65% value of 50-115, and
    the IFD25% and IFD65% values are such that the sag value is 3.1-3.4.
38) the polyurethane foam has:
    an IFD25% value of 10-40,
    an IFD40% value of 40-70,
    an IFD65% value of 50-115, and
    the IFD25% and IFD65% values are such that the sag value is 3.1-3.4.
39) the polyurethane foam has:
    an IFD25% value of 10-40,
    an IFD40% value of 40-55,
    an IFD65% value of 50-115, and
    the IFD25% and IFD65% values are such that the sag value is 3.1-3.4.
40) the polyurethane foam has:
    an IFD25% value of 10-40,
    an IFD40% value of 33-80,
    an IFD65% value of 70-95, and
    the IFD25% and IFD65% values are such that the sag value is 3.1-3.4.
41) the polyurethane foam has:
    an IFD25% value of 10-40,
    an IFD40% value of 33-80,
    an IFD65% value of 72-85, and
    the IFD25% and IFD65% values are such that the sag value is 3.1-3.4.
42) the polyurethane foam has:
    an IFD25% value of 20-30,
    an IFD40% value of 40-70,
    an IFD65% value of 70-95, and
    the IFD25% and IFD65% values are such that the sag value is 3.0-3.5.
43) the polyurethane foam has:
    an IFD25% value of 20-30,
    an IFD40% value of 40-55,
    an IFD65% value of 72-85, and
    the IFD25% and IFD65% values are such that the sag value is 3.0-3.5.
44) the polyurethane foam has:
    an IFD25% value of 20-30,
    an IFD40% value of 40-70,
    an IFD65% value of 70-95, and
    the IFD25% and IFD65% values are such that the sag value is 3.1-3.4.
45) the polyurethane foam has:
    an IFD25% value of 20-30,
    an IFD40% value of 40-55,
    an IFD65% value of 72-85, and
    the IFD25% and IFD65% values are such that the sag value is 3.1-3.4.
46) the polyurethane foam has:
    an IFD25% value of 20-24,
    an IFD40% value of 33-37,
    an IFD65% value of 70-74, and
    the IFD25% and IFD65% values are such that the sag value is 3.2-3.4.
47) the polyurethane foam has:
    an IFD25% value of 27-32,
    an IFD40% value of 41-45,
    an IFD65% value of 89-93, and
    the IFD25% and IFD65% values are such that the sag value is 3.0-3.3.
48) the polyurethane foam has:
    an IFD25% value of 37-42,
    an IFD40% value of 60-64,
    an IFD65% value of 108-112, and
    the IFD25% and IFD65% values are such that the sag value is 2.8-2.9.
49) the polyurethane foam has:
    an IFD25% value of 22-27,
    an IFD40% value of 39-43,
    an IFD65% value of 75-80, and
    the IFD25% and IFD65% values are such that the sag value is 3.0-3.4.
50) the polyurethane foam has:
    an IFD25% value of 24-26,
    an IFD40% value of 39-43,
    an IFD65% value of 76-79, and
    the IFD25% and IFD65% values are such that the sag value is 3.0-3.2.
51) the polyurethane foam has:
    an IFD25% value of 22-25,
    an IFD40% value of 39-42,
    an IFD65% value of 78-81, and
    the IFD25% and IFD65% values are such that the sag value is 3.3-3.4.

In an embodiment, the polyurethane foam is as defined in any one of numbered paragraphs (31)-(51), and the foam has a density of 35-60 kg/m³. Suitably, the foam has a density of 40-60 kg/m³. More suitably, the foam has a density of 40-55 kg/m³.

In an embodiment, the polyurethane foam is as defined in any one of numbered paragraphs (31)-(51), and the foam has a ball resilience of >60% (e.g. 60-75%).

In an embodiment, the polyurethane foam is as defined in any one of numbered paragraphs (31)-(51), and the foam exhibits BS5852 Crib5 fire retardancy. Suitably, the polyurethane foam exhibits a mass loss of <50 g during the BS5852 Crib5 test. More suitably, the polyurethane foam exhibits a mass loss of <40 g during the BS5852 Crib5 test. Most suitably, the polyurethane foam exhibits a mass loss of <36 g during the BS5852 Crib5 test.

In any of the embodiments based on numbered paragraphs (31)-(51), the polyurethane foam comprises a polyurethane formed by the reaction of at least one polyol having a molecular weight of 6,000-12,000 Da and an OH functionality of 2-4 with at least one methylene diphenyl diisocyanate having an NCO content of 26-33%. Suitably, the polyol and methylene diphenyl diisocyanate have any of those definitions discussed hereinbefore in respect of the first aspect of the invention.

In any of the embodiments based on numbered paragraphs (31)-(51), the polyurethane foam is obtainable by the process defined in any of numbered paragraphs (1)-(31) discussed hereinbefore in respect of the first aspect of invention.

Foam Applications

As described hereinbefore, the present invention also provides an article comprising a polyurethane foam according to the second or third aspect of the invention.

The unique load bearing characteristics of the foams of the present invention make them ideally suited to a variety of applications requiring not only firmness and support, but also surface softness and smoothness.

In an embodiment, the article is a pillow, cushion, mattress, mattress topper, sofa, chair, seat or footwear insole.

The following numbered clauses (1)-(49) are not claims, but instead define particular aspects and embodiments of the invention:

1. A process for the preparation of a polyurethane foam, the process comprising the steps of:
   a) mixing together the following ingredients in the amounts specified:
      i. at least one polyol having an average molecular weight of 6,000-12,000 Da, wherein the polyol has an OH functionality of 2-4,
      ii. at least one methylene diphenyl diisocyanate having an NCO content of 26-33%, wherein the amount of diisocyanate relative to the amount of polyol is sufficient to give an ISO index of 65-90,
      iii. at least one surfactant in an amount of 0.4-1.0 per hundred parts polyol,
      iv. at least one amine catalyst in an amount of 0.1-0.6 per hundred parts polyol, and
      v. water in an amount of 1.5-4.0 per hundred parts polyol;
   b) curing the mixture resulting from step a).
2. The process of clause 1, wherein the ingredients specified in step a) are mixed at a speed of 2,000-8,000 rpm, preferably 4,000-6,000 rpm.
3. The process of clause 1 or 2, wherein the polyol has a molecular weight of 7,000-9,000 Da.
4. The process of any preceding clause, wherein the polyol has an OH functionality of 2.8-3.2.
5. The process of any preceding clause, wherein the methylene diphenyl diisocyanate is a modified methylene diphenyl diisocyanate.
6. The process of any preceding clause, wherein the methylene diphenyl diisocyanate has an NCO content of 28-33%.
7. The process of any preceding clause, wherein the amount of methylene diphenyl diisocyanate relative to the amount of polyol is sufficient to give an ISO index of 70-80.
8. The process of any preceding clause, wherein in step a), the surfactant is present in an amount of 0.4-0.8 per hundred parts polyol.
9. The process of any preceding clause, wherein the amine catalyst is suitable for enhancing the nucleophilicity of the polyol.
10. The process of any preceding clause, wherein the amine catalyst is triethylene diamine.
11. The process of any preceding clause, wherein in step a), the amine catalyst is present in an amount of 0.2-0.4 per hundred parts polyol.
12. The process of any preceding clause, wherein in step a), water is present in an amount of 2.0-3.5 per hundred parts polyol.
13. The process of any preceding clause, wherein those ingredients mixed in step a) further comprise at least one flame retardant in an amount of 3.0-20.0 per hundred parts polyol.
14. The process of clause 13, wherein the flame retardant is present in an amount of 3.0-15.0 per hundred parts polyol, preferably 4.0-10.0 per hundred parts polyol.
15. The process of clause 13 or 14, wherein the flame retardant is a chlorinated phosphate ester, a halogen-free phosphate ester, or a mixture thereof.
16. The process of clause 13, 14 or 15, wherein those ingredients mixed in step a) further comprise at least one flame retardant synergist in an amount of 8.0-20.0, preferably 8.0-15.0, per hundred parts polyol.
17. The process of clause 16, wherein the flame retardant synergist is melamine-based.
18. The process of clause 16 or 17, wherein the flame retardant synergist is melamine.
19. The process of any preceding clause, wherein those ingredients mixed in step a) further comprise at least one tin catalyst in an amount of 0.01-0.2, preferably 0.01-0.1, per hundred parts polyol.
20. The process of clause 19, wherein the tin catalyst is a mild Lewis acid.
21. The process of clause 19 or 20, wherein the tin catalyst is an alkyl carboxylate.
22. The process of any one of clause 19, 20 or 21, wherein the tin catalyst is stannous octoate.
23. The process of any preceding clause, wherein those ingredients mixed in step a) further comprise at least one of a chain extender and a cross-linker in an amount of 0.2-1.5, preferably 0.6-1.2, per hundred parts polyol.
24. The process of clause 23, wherein the chain extender and/or cross-linker is diethanol amine.
25. The process of any preceding clause, wherein those ingredients mixed in step a) further comprise at least one cell opener in an amount of 1.0-5.0, preferably 2.0-4.0, per hundred parts polyol.
26. The process of clause 25, wherein the cell opener is a polyol-based compound.

27. The process of any preceding clause, wherein those ingredients mixed in step a) further comprise at least one blowing agent in an amount of 3.0-10.0, preferably 6.0-8.0, per hundred parts polyol.
28. The process of clause 27, wherein the blowing agent is methylene chloride.
29. The process of any preceding clause, wherein those ingredients mixed in step a) further comprise a pigment.
30. The process of any preceding clause, wherein in step b), the mixture resulting from step a) is cured in an atmosphere of air.
31. The process of any preceding clause, wherein in step b), the mixture resulting from step a) is cured at a temperature of 15-40° C. and a pressure of 0.9 to 1.1 bar.
32. The process of any preceding clause, wherein the process is a continuous process.
33. The process of clause 32, wherein in step a), the polyol is fed to a mixer at a rate of 100-140 kg/min, preferably 110-130 kg/min.
34. The process of clause 32 or 33, wherein in step a), the methylene diphenyl diisocyanate is fed to a mixer at a rate of 30-80 kg/min, preferably 40-60 kg/min.
35. The process of clause 32, 33 or 34, wherein in step a), the surfactant is fed to a mixer at a rate of 45-85 kg/min, preferably 55-75 kg/min.
36. The process of any one of clause 32 to 35, wherein in step a), the amine catalyst is fed to a mixer at a rate of 20-50 kg/min, preferably 30-40 kg/min.
37. The process of any one of clause 32 to 36, wherein in step a), water is fed to a mixer at a rate of 2-6 kg/min, preferably 3-5 kg/min.
38. A polyurethane foam obtainable by the process of any preceding clause.
39. A polyurethane foam having a sag value of 2.8-3.5, wherein the sag value is calculated according to the following expression:

$$\text{Sag value} = \frac{IFD65\%}{IFD25\%}$$

and wherein IFD65% and IFD25% values are determined according to the protocol set forth in ISO 2439:2008.
40. The polyurethane foam of clause 38 or 39, wherein the polyurethane foam has a sag value of 3.1-3.4.
41. The polyurethane foam of any one of clause 38, 39 or 40, wherein the polyurethane foam has an IFD25% value of 10-40, preferably 20-30, wherein the IFD25% value is determined according to the protocol set forth in ISO 2439:2008.
42. The polyurethane foam of any one of clause 38 to 41, wherein the polyurethane foam has an IFD40% value of 20-50, preferably 30-40, wherein the IFD40% value is determined according to the protocol set forth in ISO 2439:2008.
43. The polyurethane foam of any one of clause 38 to 42, wherein the polyurethane foam has an IFD65% value of 50-100, preferably 60-90, wherein the IFD65% value is determined according to the protocol set forth in ISO 2439:2008.
44. The polyurethane foam of any one of clause 38 to 43, wherein the polyurethane foam has a density of 40-60 kg/m³, preferably 45-50 kg/m³.
45. The polyurethane foam of any one of clause 38 to 44, wherein the polyurethane foam comprises a polyurethane formed by the reaction of at least one polyol having a molecular weight of 6,000-12,000 Da and an OH functionality of 2-4 with at least one methylene diphenyl diisocyanate having an NCO content of 26-33%.
46. The polyurethane foam of any one of clause 38 to 45, wherein the polyurethane foam comprises one or more of a chlorinated phosphate ester and a halogen-free phosphate ester fire retardant, or a residue thereof.
47. The polyurethane foam of any one of clause 38 to 46, wherein the polyurethane foam exhibits BS5852 Crib5 fire retardancy.
48. An article comprising a polyurethane foam according to any one of clause 38 to 47.
49. The article of clause 48, wherein the article is a pillow, cushion, mattress, mattress topper, sofa, chair, seat or footwear insole.

EXAMPLES

One or more examples of the invention will now be described, for the purpose of illustration only, with reference to the accompanying figures, in which.

MATERIALS AND METHODS

In following examples, the components used were:
Polyol A: Caradol SC56-02 (560H value, 3000 mwt.), available from Shell Chemicals Company;
Polyol B: GLR2000 (2400H value, 700 mwt.), available from Sinopec Shanghai Gaoqiao Chemical Company;
Active Polyol C: polyol 330N (330H value 5000 mwt), available from Sinopec Shanghai Gaoqiao Chemical Company;
Active polyol D: polyol GEP828 (28 OH value 8000 mwt) from Sinopec Shanghai Gaoqiao Chemical Company;
Flame retardant FR508, available from Yoke Chemicals Company;
Flame retardant synergist: melamine;
Surfactant A: B2470, available from Evonik;
Amine catalyst: Niax A1 (available from Momentive) and Dabco 33-LV (available from Air product);
Tin Catalyst: K29 from Enovik;
Toluene diisocyanate (TDI) is available from BASF;
Modified methylene diphenyl diisocyanate (MDI) 6510, available from Huntsmen Chemicals Company (NCO % 29.9);
Surfactant B: B8002, available from Evonik;
Surfactant L5333 from Momentive;
Cell opener: PK101, available from Fushun Chemical Company;
Cell opener: KZ28, available from Nanjing Aosai Chemical Co.
Blow agent: Methylene chloride;
Chain extender/cross linker: Diethanol amine.

Figure 1:
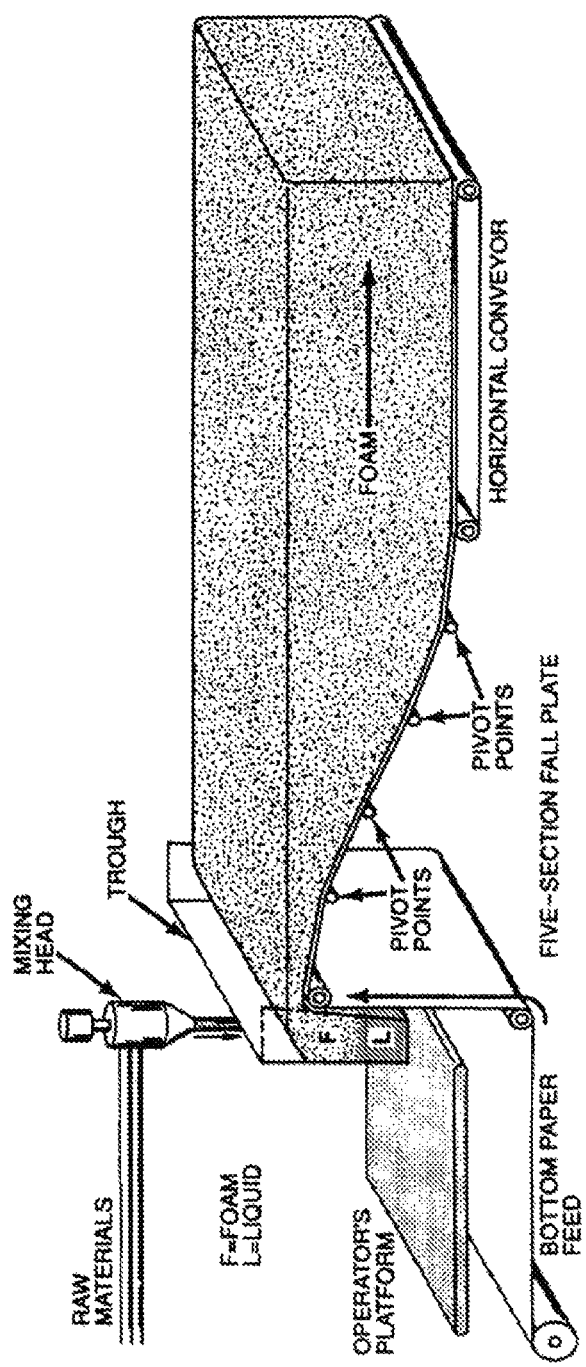
FIG. 1 shows a continuous foam forming process used in the preparation of the foams of the examples and comparative examples. The process parameters were: mixing head pressure—0.3 MPa; air injection—0.1 L/min; raw materials temperature—22° C.; foaming speed—4.0 m/min; mixing head mixing speed—5000 rpm.
Figure 2:
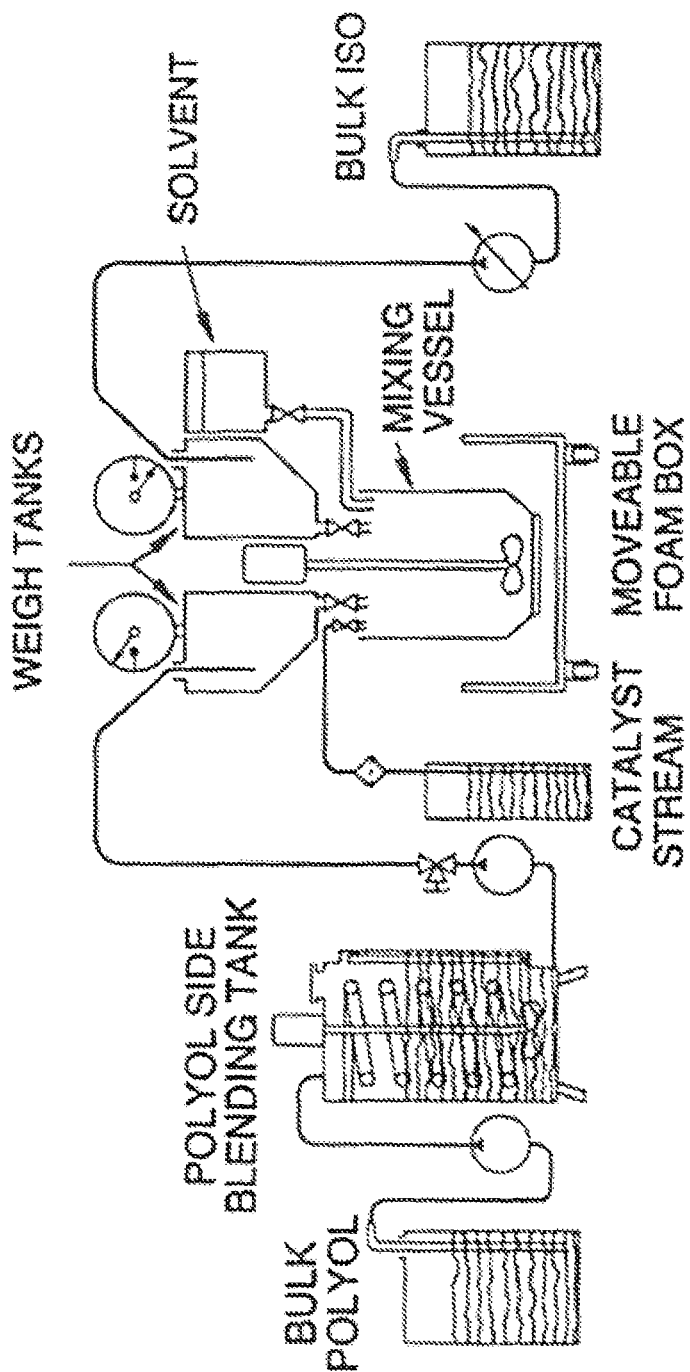
FIG. 2 shows a box foaming (discontinuous) process.

In the following examples, foams were prepared using the continuous foaming process depicted in FIG. 1.

Example 1

Having regard to Table 1 below, a flexible polyurethane foam was prepared according to the continuous foaming process depicted in FIG. 1 using the ingredients and amounts specified.

TABLE 1

Ingredients used in the preparation of flexible polyurethane foam of Example 1

| Ingredients | Parts/php* | Flow rate to mixer head (kg/min) |
| --- | --- | --- |
| Active polyol D | 100 | 120 |
| Flame retardant FR 508 | 7 | 8.4 |
| Melamine | 10 | 12 |
| $H_2O$ | 3.2 | 3.84 |
| Methylene chloride | 7 | 8.4 |
| Surfactant L5333 | 0.55 | 0.66 |
| Amine catalyst | 0.3 | 0.36 |
| Tin Catalyst | 0.03 | 0.04 |
| Cell opening agent | 3 | 3.6 |
| Diethanol amine | 0.8 | 0.96 |
| Modified MDI | 40** | 48 |

*per hundred parts polyol;
**amount of MDI was sufficient to give an ISO index of 75.

After forming, the foam was left to cure at room temperature for 72 hours.

The properties (density, sag value and fire retardancy) of the cured flexible polyurethane foam of Example 1 were then assessed. The results are presented in Table 2 below.

TABLE 2

Density, sag value and fire retardancy properties of flexible polyurethane foam of Example 1

| | |
| --- | --- |
| Foam density (kg/m$^3$) | 45 |
| IFD25%/N | 22.1 |
| IFD40%/N | 34.8 |
| IFD65%/N | 72.2 |
| Sag value (IFD65%/IFD25%) | 3.3 |
| BS5852 crib5 fire retardancy | Pass, 34 g mass loss |

As can be seen from the data presented in Table 2, the IFD25% of the flexible polyurethane foam of Example 1 is 22.1N, which is substantially lower than that observed for conventional, HR and visco-elastic polyurethane foams. This value reflects the high surface softness and smoothness of the flexible polyurethane foam of Example 1 when compared with other polyurethane foams. However in spite of the high surface softness and smoothness, the data presented in Table 2 illustrate that the sag value of the flexible polyurethane foam—which is typically used to gauge the level of comfort offered by a foam—is 3.3, which is notably higher than that observed for conventional, HR and visco-elastic polyurethane foams. This means that the foam of Example 1, despite having excellent surface softness and smoothness characteristics, also offers remarkable support, without excessive sinking. This is likely due to the fact that whilst the upper surface of the foam is soft, the firmness of the foam increases sharply upon continued application of pressure.

In addition to the above, the flexible polyurethane foam of Example 1 meets the BS5852 crib 5 flammability standard—a UK requirement which is perhaps the most stringent of all international flame retardancy standards. Achieving high surface-softness, high sag value and BS5852 crib 5 compliance in a single polyurethane foam is particularly advantageous.

Comparative Example 2—Conventional Flame-Retardant Polyurethane Foam

Having regard to Table 3 below, a flexible conventional flame-retardant polyurethane foam was prepared according to the continuous foaming process depicted in FIG. 1 using the ingredients and amounts specified.

TABLE 3

Ingredients used in the preparation of flexible polyurethane foam of Comparative Example 2

| Ingredients | Parts/php* | Flow rate to mixer head (kg/min) |
| --- | --- | --- |
| Polyol, A | 100 | 150 |
| Flame retardant FR508 | 15 | 22.5 |
| Melamine | 30 | 45 |
| $H_2O$ | 3.2 | 4.8 |
| Methylene chloride | 3 | 4.5 |
| Surfactant A | 1.2 | 1.8 |
| Amine catalyst | 0.3 | 0.45 |
| Tin Catalyst | 0.24 | 0.36 |
| TDI (NCO %: 48.3) | 45.6** | 68.4 |

*per hundred parts polyol;
**amount of TDI was sufficient to give an ISO index of 115.

After forming, the foam was left to cure at room temperature for 72 hours.

The properties (density, sag value and fire retardancy) of the cured flexible polyurethane foam of Comparative Example 2 were then assessed. The results are presented in Table 4 below.

TABLE 4

Density, sag value and fire retardancy properties of flexible polyurethane foam of Comparative Example 1

| | |
| --- | --- |
| Foam density (kg/m$^3$) | 32 |
| IFD25%/N | 85.5 |
| IFD40%/N | 123.2 |
| IFD65%/N | 189.5 |
| Sag value (IFD65%/IFD25%) | 2.2 |
| BS5852 crib5 | Pass, 32 g mass loss |

The foam of Comparative Example 2 is a typical BS5852 Crib5-compliant conventional polyurethane foam. Despite being fire retardant, the conventional polyurethane foam of Comparative Example 2 has an extremely high IFD25% value, which manifests itself as poor surface softness characteristics. As a consequence, the foam of Comparative Example 2 is only suitable for use as a base layer in mattresses, and cannot be used in the upper surface on which a consumer sleeps.

Comparative Example 3—Visco-Elastic Polyurethane Foam

Having regard to Table 5 below, a flexible polyurethane visco-elastic foam was prepared according to the continuous foaming process depicted in FIG. 1 using the ingredients and amounts specified.

TABLE 5

Ingredients used in the preparation of flexible polyurethane foam of Comparative Example 3

| Ingredients | Parts/php* | Flow rate to mixer head (kg/min) |
|---|---|---|
| Polyol A | 50 | 75 |
| Polyol B | 50 | 75 |
| $H_2O$ | 2 | 3 |
| Surfactant B | 0.8 | 1.2 |
| Amine catalyst | 0.4 | 0.6 |
| Tin Catalyst | 0.08 | 0.12 |
| cell open agent | 4 | 6 |
| TDI (NCO %: 48.3) | 37.2** | 55.8 |

*per hundred parts polyol;
**amount of TDI was sufficient to give an ISO index of 88.

After forming, the foam was left to cure at room temperature for 72 hours.

The properties (density, sag value and fire retardancy) of the cured flexible polyurethane visco-elastic foam of Comparative Example 3 were then assessed. The results are presented in Table 6 below.

TABLE 6

Density, sag value and fire retardancy properties of flexible polyurethane foam of Comparative Example 3

| | |
|---|---|
| Foam density (kg/m³) | 43 |
| IFD25%/N | 30.4 |
| IFD40%/N | 43.6 |
| IFD65%/N | 60.2 |
| Sag value (IFD65%/IFD25%) | 2.0 |
| BS5852 crib5 | Fail, burnt out |

The foam of Comparative Example 3 is a visco-elastic foam that is widely used in pillows, mattresses and mattress toppers. Although visco-elastic foams offer softness and are able to conform to the body in order to distribute body pressure evenly, they suffer from the standpoint of providing sufficient support. As can be seen from the data presented in Table 6, sag value of the visco-elastic foam of Comparative Example 3 is only 2.0, which translates to a consumers feeling that they are sunken into the foam, rather than being properly supported by it.

Comparative Example 4—Flame-Retardant HR Polyurethane Foam

Having regard to Table 7 below, a flexible polyurethane HR foam was prepared according to the continuous foaming process depicted in FIG. 1 using the ingredients and amounts specified.

TABLE 7

Ingredients used in the preparation of flexible polyurethane foam of Comparative Example 4

| Ingredients | Parts/php | Flow rate to mixer head (kg/min)* |
|---|---|---|
| Active polyol C | 100 | 150 |
| Flame retardant | 8 | 12 |
| Melamine | 15 | 18 |
| $H_2O$ | 3 | 4.5 |
| Methylene chloride | 3 | 4.5 |
| Surfactant C | 0.6 | 0.9 |
| Amine catalyst | 0.3 | 0.45 |
| Tin Catalyst | 0.1 | 0.15 |
| Diethanol amine | 1 | 1.5 |
| TDI (NCO %: 48.3) | 40.2** | 60.3 |

*per hundred parts polyol;
**amount of TDI was sufficient to give an ISO index of 110.

After forming, the foam was left to cure at room temperature for 72 hours.

The properties (density, sag value and fire retardancy) of the cured flexible polyurethane HR foam of Comparative Example 4 were then assessed. The results are presented in Table 8 below.

TABLE 8

Density, sag value and fire retardancy properties of flexible polyurethane foam of Comparative Example 4

| | |
|---|---|
| Foam density (kg/m³) | 31 |
| IFD25%/N | 67.4 |
| IFD40%/N | 100.5 |
| IFD65%/N | 182 |
| Sag value (IFD65%/IFD25%) | 2.7 |
| BS5852 crib5 | Pass, 35 g mass loss |

The foam of Comparative Example 4 is a typical BS5852 Crib5-compliant HR polyurethane foam. The foam exhibits good support properties, due in part to the higher molecular weight of polyol used in comparison to conventional and visco-elastic foams, which makes the HR foam widely useable in the seat portion of chairs and sofas. However, the HR polyurethane foam of Comparative Example 4 has an extremely high IFD25% value, which manifests itself as poor surface softness characteristics. As a consequence, the foam of Comparative Example 4 is unsuitable for use in pillows and mattress toppers, wherein high surface-softness is necessary.

Example 5

Having regard to Tables 9 and 10 below, various polyurethane foams were prepared according to the continuous foaming process depicted in FIG. 1 using the ingredients and amounts specified.

TABLE 9

Composition and properties of various polyurethane foams

| Foam | 1 | 2* | 3 | 4* | 5 | 6 |
|---|---|---|---|---|---|---|
| FOAM COMPOSITION | | | | | | |
| Active polyol D | 100 | 100 | 100 | 100 | 100 | 100 |
| Cell opener KZ28/phpp | 3 | 3 | 3 | 3 | 3 | 5 |
| Flame retardant FR508/phpp | 3 | 20 | 12 | 12 | 12 | 0 |
| Melamine/phpp | 15 | 15 | 15 | 15 | 15 | 0 |
| Silicone surfactant L5333/phpp | 0.7 | 0.7 | 0.7 | 0.7 | 0.7 | 0.7 |
| Amine catalyst/phpp | 0.5 | 0.5 | 0.5 | 0.5 | 0.5 | 0.5 |
| Tin catalyst/phpp | 0.05 | 0.05 | 0.05 | 0.05 | 0.05 | 0.05 |
| H2O/phpp | 2 | 2 | 4 | 1 | 2 | 2 |
| Blow agent/phpp | 5 | 5 | 5 | 5 | 5 | 2 |
| TEOA/phpp | 0.6 | 0.6 | 0.6 | 0.6 | 0.6 | 0.6 |
| ISO index** | 90 | 90 | 90 | 90 | 90 | 100 |
| FOAM PROPERTIES | | | | | | |
| Cream time/s | 10 | 12 | 8 | 30 | 10 | 8 |
| Full rising time/s | 163 | 183 | 125 | N/A | 172 | 159 |
| Foam density/kg/m3 | 54.2 | 60.4 | 36.3 | N/A | 57.2 | 55.2 |
| IFD 25/40/65(N) | 29/43/91 | 29.3/41.1/78.2 | 39.5/62/110.2 | N/A | 25.2/41.3/77.2 | 23.5/40.3/79.2 |
| Sag value | 3.1 | 2.67 | 2.8 | N/A | 3.1 | 3.4 |
| Ball resilience/% | 62 | 52 | 50 | N/A | 65 | 69 |
| Overall foam physical performance (1-5; 1 = poor, 5 = excellent) | 5 | 2 | 3 | N/A | 5 | 5 |
| FR BS5852 crib 5 test | Fail. Foam continued burning after 10 mins. Mass loss > 60 g | Pass. Mass loss 38 g after 4 mins 35 sec | Fail. Foam continued burning after 10 mins. Mass loss > 60 g | N/A | Pass. Mass loss 35 g after 4 mins 55 sec | Fail. Foam continued burning after 10 mins. Mass loss > 60 g |
| Comments | Foam exhibits excellent physical properties. Not enough flame retardant to confer BS5852 crib 5 compliance | BS5852 crib 5 compliant, but high content of flame retardant compromised physical properties of foam | Higher water content gave rise to certain defects in foam, and overall poorer physical properties | Low water content hampered foam rising. Sample not cured | BS5852 crib 5 compliant and excellent physical properties | Foam exhibits excellent physical properties. Lack of flame retardant meant foam was not BS5852 crib 5 compliant |

*comparative example;
**ISO index achieved by adding appropriate amount of modified MDI; phpp-per hundred parts polyol

TABLE 10

Composition and properties of various polyurethane foams

| Foam | 7* | 8* | 9* | 10* | 11* | 12* |
|---|---|---|---|---|---|---|
| FOAM COMPOSITION | | | | | | |
| Active polyol D | 100 | 100 | 100 | 100 | 100 | 100 |
| Cell opener KZ28/phpp | 3 | 3 | 3 | 3 | 3 | 3 |
| Flame retardant FR508/phpp | 12 | 12 | 12 | 12 | 12 | 12 |
| Melamine/phpp | 15 | 15 | 15 | 15 | 15 | 15 |
| Silicone surfactant L5333/phpp | 0.7 | 0.7 | 0.7 | 0.7 | 0.1 | 2 |
| Amine catalyst/phpp | 0.1 | 1 | 0.5 | 0.5 | 0.5 | 0.5 |
| Tin catalyst/phpp | 0.05 | 0.05 | 0.05 | 0.05 | 0.05 | 0.05 |

TABLE 10-continued

Composition and properties of various polyurethane foams

| Foam | 7* | 8* | 9* | 10* | 11* | 12* |
|---|---|---|---|---|---|---|
| H2O/phpp | 2 | 2 | 2 | 2 | 2 | 2 |
| Blow agent/phpp | 5 | 5 | 5 | 5 | 5 | 2 |
| TEOA/phpp | 0.6 | 0.6 | 0.6 | 0.6 | 0.6 | 0.6 |
| ISO index** | 90 | 90 | 70 | 120 | 90 | 90 |
| FOAM PROPERTIES | | | | | | |
| Cream time/s | 40 | 2 | 16 | 8 | 11 | 10 |
| Full rising time/s | NA | 81 | 192 | 150 | NA | 172 |
| Foam density/kg/m3 | NA | NA | 65.2 | 55.2 | NA | NA |
| IFD 25/40/65(N) | NA | NA | 14.2/24.2/45.2 | 40.4/65.8/110.8 | NA | NA |
| Sag value | NA | NA | 3.2 | 2.7 | NA | NA |
| Ball resilience/% | NA | NA | 53 | 52 | NA | NA |
| Overall foam physical performance (1-5; 1 = poor, 5 = excellent) | NA | 1 | 2 | 2 | 1 | 1 |
| FR BS5852 crib 5 test | NA | NA | Fail. Foam continued burning after 10 mins. Mass loss > 60 g | Pass. Mass loss 28 g after 3 mins 56 sec | NA | NA |
| Comments | Insufficient amount of amine catalyst for foam to rise | Excessive amount of amine catalyst caused foam to rise too quickly, causing splitting | Low ISO index resulted in overly soft foam having poor support characteristics. Flame retardancy also compromised | High ISO index resulted in overly firm foam having a closed cell structure and poor surface smoothness | Insufficient amount of surfactant led to larger cells, causing foam collapse while rising | Excessive amount of surfactant led to closed cell structure, causing foam shrinkage after curing |

*comparative example;
**ISO index achieved by adding appropriate amount of modified MDI; phpp-per hundred parts polyol The results presented in Tables 9 and 10 illustrate the effect of varying the amount of the various ingredients of the foam.

While specific embodiments of the invention have been described herein for the purpose of reference and illustration, various modifications will be apparent to a person skilled in the art without departing from the scope of the invention as defined by the appended claims.

The invention claimed is:

1. A process for the preparation of a polyurethane foam, the process comprising the steps of:
   a) mixing together the following ingredients in the amounts specified:
      i. at least one polyol having an average molecular weight of 7,500-8,500 Da, wherein the polyol has an OH functionality of 2-4 and an OH value of 26-30,
      ii. at least one methylene diphenyl diisocyanate having an NCO content of 29-31%, wherein the amount of diisocyanate relative to the amount of polyol is sufficient to give an ISO index of 72-110, wherein the methylene diphenyl diisocyanate is a modified methylene diphenyl diisocyanate,
      iii. at least one surfactant in an amount of 0.5-0.75 per hundred parts polyol,
      iv. at least one blowing agent in an amount of 1.5-8.0 per hundred parts polyol,
      v. at least one cell opener in an amount of 2.0-5.5 per hundred parts polyol,
      vi. at least one amine catalyst in an amount of 0.2-0.55 per hundred parts polyol,
      vii. at least one tin catalyst in an amount of 0.01-0.1 per hundred parts polyol,
      viii. water in an amount of 1.5-3.3 per hundred parts polyol, and
      ix. optionally at least one flame retardant in an amount of 6.5-14.0 per hundred parts polyol, wherein when a flame retardant is used, it is used in conjunction with a melamine-based flame-retardant synergist, wherein the melamine-based flame retardant synergist, when present, is present in an amount of 9.0-17.0 per hundred parts polyol;
   b) curing the mixture resulting from step a);
   wherein, in step a), the polyol is fed to a mixer at a rate of 100-140 kg/min.

2. The process of claim 1, wherein the ingredients specified in step a) are mixed at a speed of 2,000-8,000 rpm.

3. The process of claim 1, wherein the polyol is a polyether polyol and/or has an OH functionality of 2.8-3.2.

4. The process of claim 1, wherein the amine catalyst is triethylene diamine.

5. The process of claim 1, wherein in step a), the at least one flame retardant is present in an amount of 6.5-14.0 per hundred parts polyol, or the flame retardant is present in an amount of 8.0-13.5 per hundred parts polyol.

6. The process of claim 1, wherein the tin catalyst is an alkyl carboxylate.

7. The process of claim 1, wherein those ingredients mixed in step a) further comprise at least one of a chain extender and a cross-linker in an amount of 0.2-1.5 per hundred parts polyol, and the chain extender and/or cross-linker is diethanol amine.

8. The process of claim 1, wherein in step b), the mixture resulting from step a) is cured in an atmosphere of air.

9. The process of claim 1, wherein in step a),
   the polyol is fed to a mixer at a rate of 100-140 kg/min, or
   the methylene diphenyl diisocyanate is fed to a mixer at a rate of 30-80 kg/min, or the surfactant is fed to a mixer at a rate of 45-85 kg/min, or the amine catalyst is fed to a mixer at a rate of 20-50 kg/min, or water is fed to a mixer at a rate of 2-6 kg/min.

10. The process of claim 1, wherein the process comprises the steps of:
   a) mixing together the following ingredients in the amounts specified:
      i. at least one polyol having an average molecular weight of 7,500-8,500 Da, wherein the polyol has an OH functionality of 2.8-3.2 and an OH value of 26-30,
      ii. at least one methylene diphenyl diisocyanate having an NCO content of 29-31%, wherein the amount of diisocyanate relative to the amount of polyol is sufficient to give an ISO index of 72-100, wherein the methylene diphenyl diisocyanate is a modified methylene diphenyl diisocyanate,
      iii. at least one surfactant in an amount of 0.55-0.75 per hundred parts polyol,
      iv. at least one blowing agent in an amount of 4.0-8.0 per hundred parts polyol,
      v. at least one cell opener in an amount of 2.0-5.5 per hundred parts polyol,
      vi. at least one amine catalyst in an amount of 0.2-0.55 per hundred parts polyol,
      vii. at least one tin catalyst in an amount of 0.01-0.05 per hundred parts polyol,
      viii. water in an amount of 1.5-3.3 per hundred parts polyol, and
      ix. at least one of a chain extender and a cross-linker in an amount of 0.6-1.2 per hundred parts polyol,
      x. optionally at least one flame retardant in an amount of 6.5-14.0 per hundred parts polyol, wherein when a flame retardant is used, it is used in conjunction with a melamine-based flame-retardant synergist, wherein the melamine-based flame retardant synergist, when present, is present in an amount of 9.0-17.0 per hundred parts polyol;
   b) curing the mixture resulting from step a) to form a polyurethane foam having a density of 40-60 kg/m$^3$ wherein, in step a), the polyol is fed to a mixer at a rate of 110-130 kg/min.

\* \* \* \* \*